United States Patent [19]

Mahoney et al.

[11] Patent Number: 5,038,832
[45] Date of Patent: Aug. 13, 1991

[54] CORED HIGH DENSITY SHIRRED CASINGS

[75] Inventors: George H. Mahoney, Country Club Hills; John H. Beckman, Downers Grove; Arthur L. Sheridan, Woodbridge, all of Ill.

[73] Assignee: Viskase Corporation, Chicago, Ill.

[21] Appl. No.: 761,675

[22] Filed: Aug. 2, 1985

Related U.S. Application Data

[63] Continuation of Ser. No. 363,851, Apr. 5, 1982, abandoned, which is a continuation-in-part of Ser. No. 339,250, Jan. 1, 1982, abandoned, which is a continuation-in-part of Ser. No. 261,304, May 1, 1981, abandoned.

[51] Int. Cl.$^5$ .............................................. A22C 13/00
[52] U.S. Cl. .................................. 138/109; 138/118.1; 138/121; 428/34.8; 17/1 R; 17/41; 426/135
[58] Field of Search ........................ 138/118.1, 121, 122, 138/109; 17/1 R, 42, 49, 33, 41; 206/802; 426/105, 135, 138

[56] References Cited

U.S. PATENT DOCUMENTS

| | | |
|---|---|---|
| 1,616,971 | 2/1927 | Henderson . |
| 1,868,203 | 7/1932 | Henderson et al. . |
| 2,001,461 | 5/1935 | Hewitt . |
| 3,110,058 | 11/1963 | Marbach .................................. 17/42 |
| 3,122,779 | 3/1964 | Blechschmidt ......................... 17/41 |
| 3,209,398 | 10/1965 | Zioko ...................................... 17/42 |
| 3,397,069 | 8/1968 | Urbutis et al. ..................... 138/118.1 |
| 3,456,286 | 7/1969 | Martinek ................................. 17/49 |
| 3,528,825 | 9/1970 | Doughty ................................. 99/176 |
| 3,826,852 | 7/1974 | Levaco et al. ...................... 146/132 |
| 3,892,869 | 7/1975 | Sheridan et al. .................... 426/138 |
| 4,044,426 | 8/1977 | Kupcikevicious et al. ............. 17/49 |
| 4,077,090 | 3/1978 | Frey et al. .............................. 17/41 |
| 4,202,075 | 5/1980 | Michel et al. . |

FOREIGN PATENT DOCUMENTS

| | | |
|---|---|---|
| 744313 | 3/1970 | Belgium . |
| 454765 | 3/1949 | Canada . |
| 499894 | 5/1930 | Fed. Rep. of Germany . |
| 2649249 | 5/1977 | Fed. Rep. of Germany . |
| 2809358 | 9/1979 | Fed. Rep. of Germany . |
| 1301284 | 6/1961 | France . |
| 378717 | 7/1964 | Switzerland . |
| 470139 | 3/1969 | Switzerland . |
| 7503575 | 9/1975 | Switzerland . |
| 942207 | 11/1963 | United Kingdom . |
| 1043435 | 9/1966 | United Kingdom . |
| 1104528 | 2/1968 | United Kingdom . |
| 1167377 | 10/1969 | United Kingdom . |
| 1241210 | 8/1971 | United Kingdom . |
| 1267871 | 3/1972 | United Kingdom . |
| 1425767 | 2/1976 | United Kingdom . |
| 2003015 | 3/1979 | United Kingdom . |
| 1593996 | 7/1981 | United Kingdom . |
| 2100571 | 1/1983 | United Kingdom . |

OTHER PUBLICATIONS

Sausage Casing Technology pp. 256–257 (Pub. by Noyes Data Corp. 1974).

*Primary Examiner*—James E. Bryant, III
*Attorney, Agent, or Firm*—Roger Aceto

[57] ABSTRACT

Flexible tubular cellulosic food casing shirred and compressed onto a rigid hollow tubular core to a high compaction condition to produce a casing stick with additional stuffing length capacity, enhanced structural stability and strength, and larger stuffing horn adaptability.

10 Claims, 9 Drawing Sheets

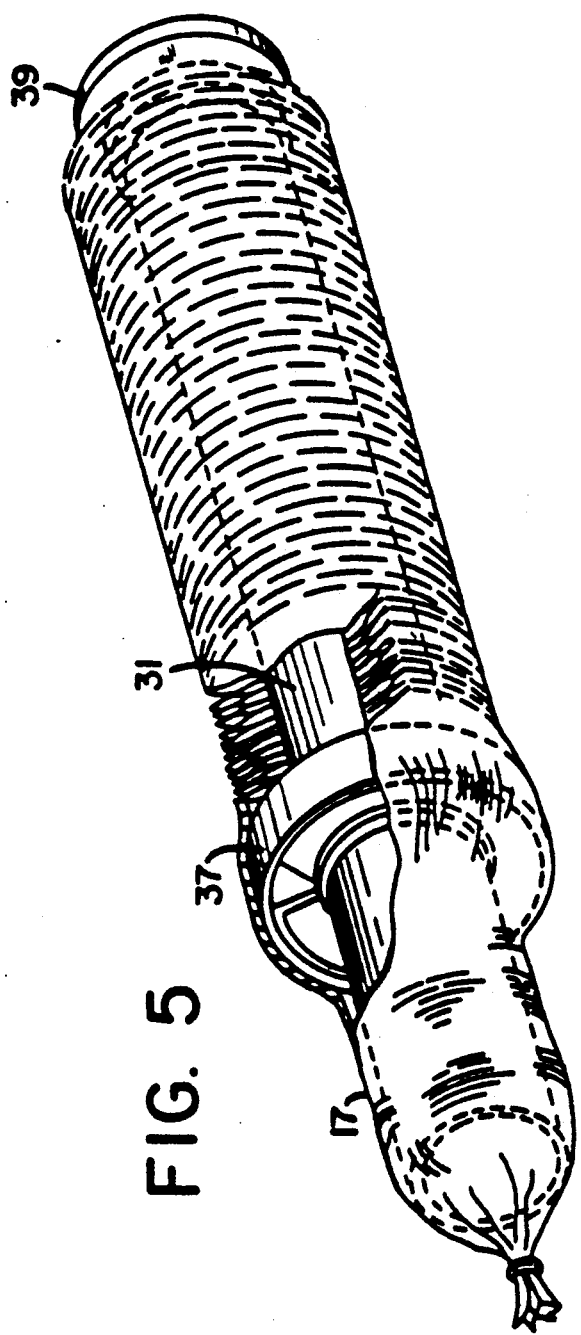
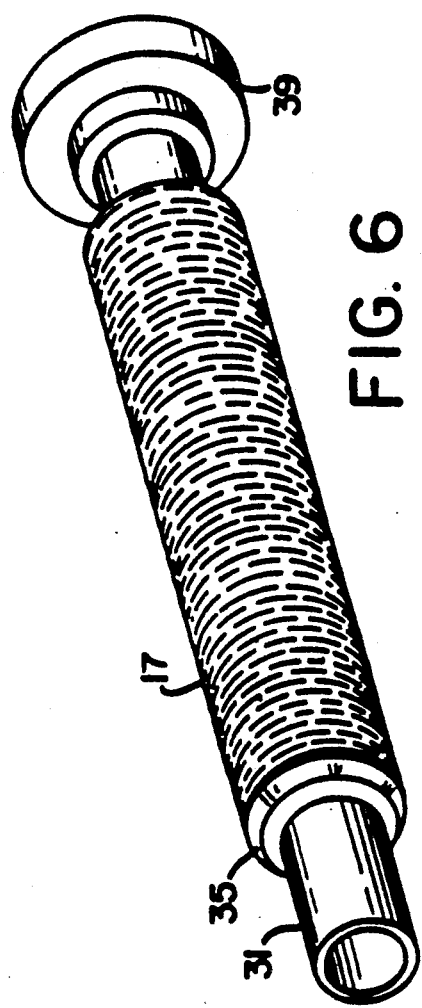
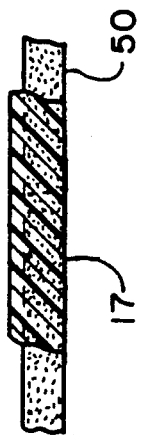

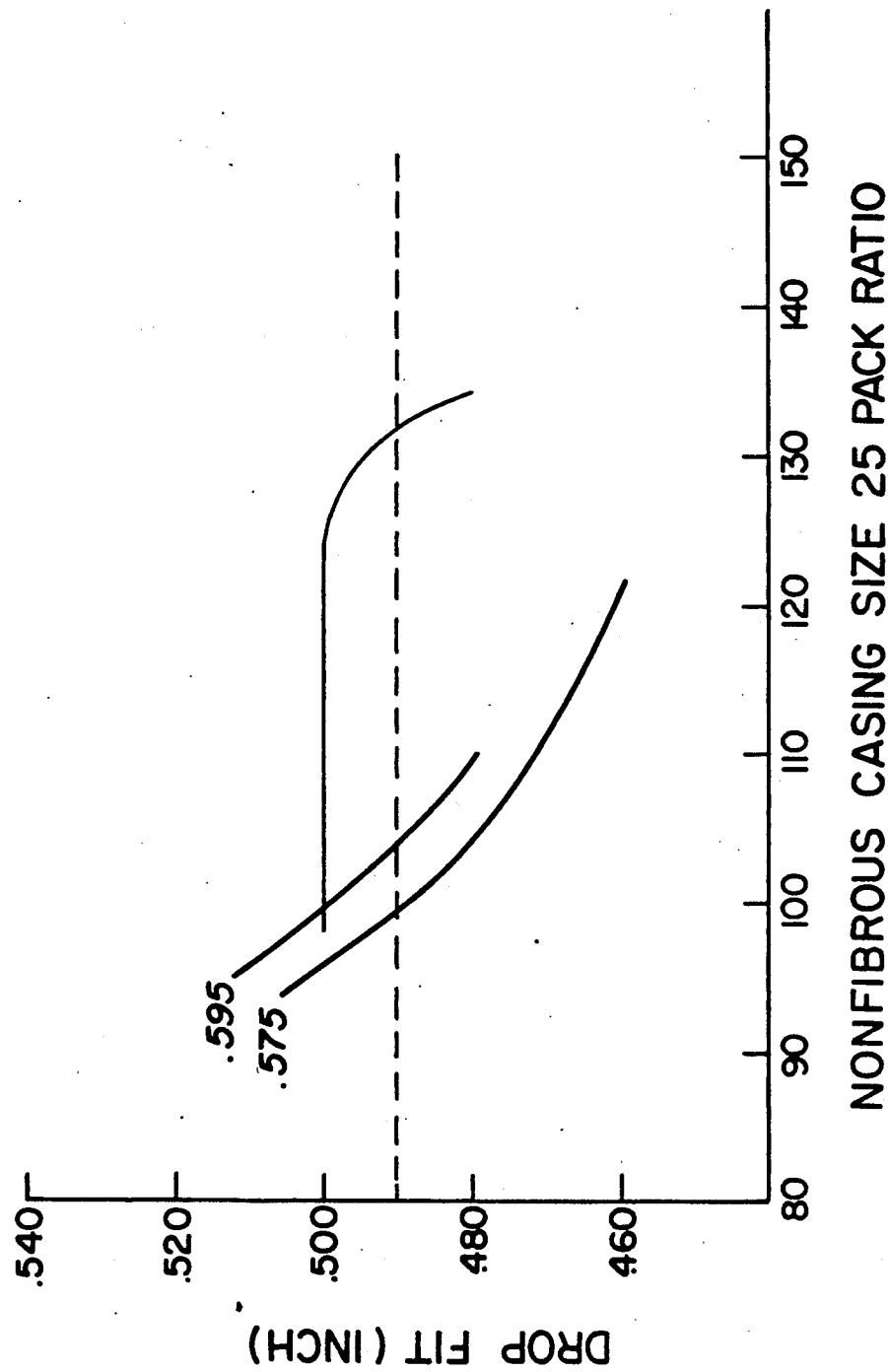

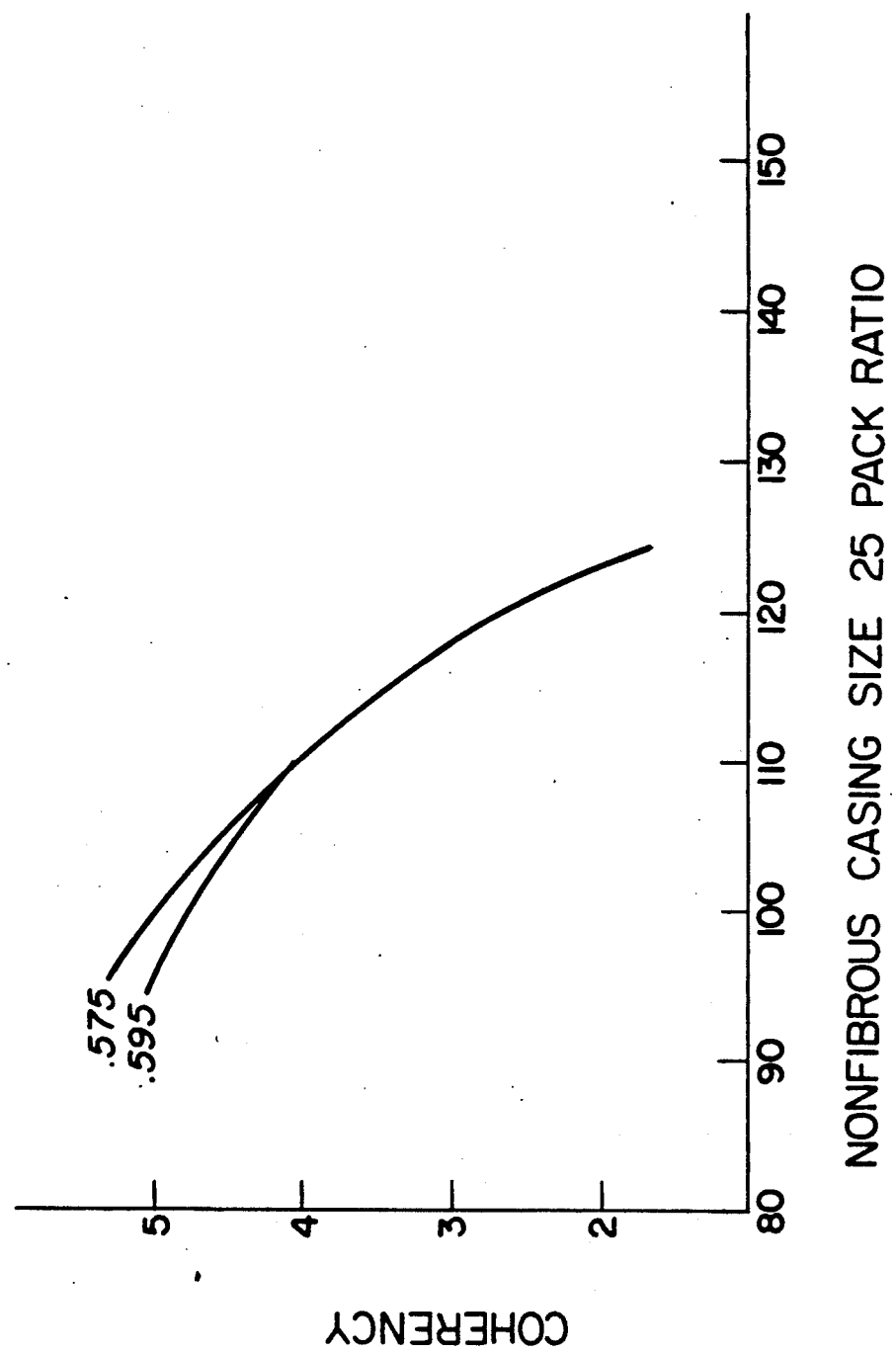

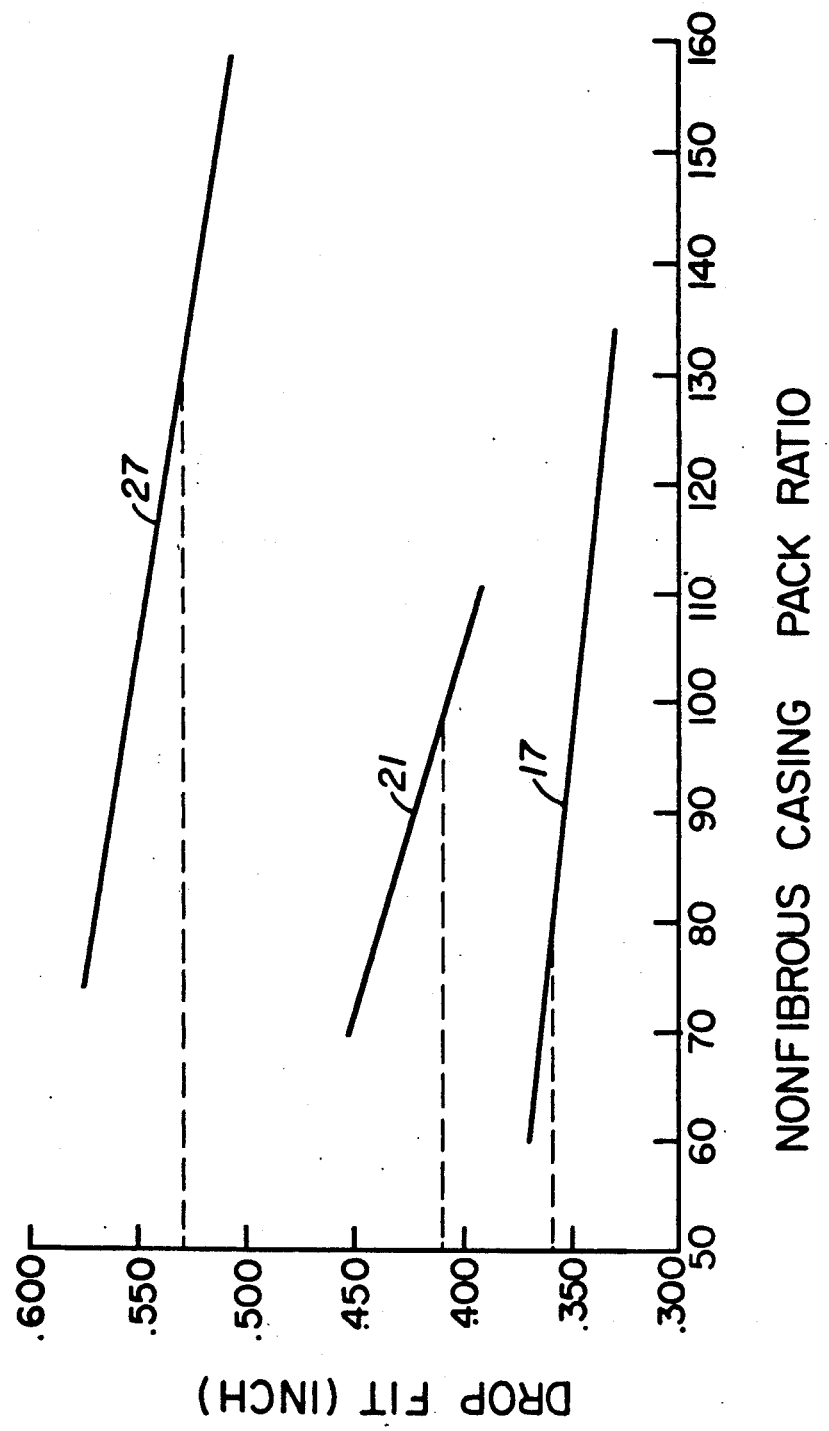

CORED HIGH DENSITY SHIRRED CASINGS

This application is a continuation of prior U.S. application Ser. No. 363,851 filing date Apr. 5, 1982, now abandoned, which is a continuation-in-part of application Ser. No. 339,250 filing date Jan. 1, 1982, now abandoned, which is a continuation-in-part of application Ser. No. 261,304 filing date May 1, 1981, now abandoned.

INTRODUCTION

This invention relates to cellulosic food casings, more particularly to shirred cellulosic food casings compactedly mounted on rigid hollow tubular cores to a high compaction condition to produce shirred casing sticks which have significantly additional stuffable length, improved structural stability and strength, and the added feature of rendering casings presently commercially available in given sizes adaptable for utilization on larger bore stuffing horns than heretofore possible. The invention is particularly useful in the production of shirred casing stick articles used in the food industry for the manufacture of sausage products of all sizes, and it also finds significant advantages for use in the stuffing into casing lengths of chunk form food products such as whole boned meat articles.

TYPES OF CASINGS

Artificial food casings used throughout the world in processing a great variety of meat and other food products, such as sausages of various types, cheese rolls, turkey rolls, and the like are customarily prepared from regenerated cellulose and other cellulosic materials. Casings are of several different types and sizes to accommodate the different categories of food product to be prepared and are provided in supported or unsupported form, the supported casings, commonly referred to as "fibrous casings", having a fibrous support web embedded in the casing wall.

A common feature of many processed food products, particularly meat products, is that the mixture of comestible ingredients, commonly called an "emulsion", is stuffed into a casing under pressure and processing of the food product is carried out after its encasement. The food product may also be stored and shipped while encased in the casing, although in many instances, and particularly with small sausage products such as frankfurters, the casing is removed from the food product after completion of the processing.

The designation "small food casings" refers generally to those casings employed in the preparation of small size sausage products such as frankfurters. As the name suggests, this type of food casing is small in stuffed diameter, generally having an inflated diameter within the range of from about 13 mm to about 40 mm, and is most usually supplied as unsupported thin-walled tubes of very great length. For convenience in handling, these casings, which may be 20 to 50 meters in length or even longer, are shirred and compressed to produce what is commonly referred to as "shirred casing sticks" of from about 20 cm to about 60 cm in length. Shirring machines and the products thereof are shown in U.S. Pat. Nos. 2,983,949 and 2,984,574 among others.

"Large size food casings", the common designation for casings used in the preparation of generally larger food products, such as salami and bologna sausages, meat loaves, cooked and smoked ham butts and the like, are produced in stuffed diameter sizes of from about 40 mm to about 200 mm or even larger. In general, such casings have a wall thickness about three times greater than "small size casings" wall thickness and are provided with a fibrous web reinforcement embedded in the wall, although they may be prepared without such supporting medium. For many years the large size tubular casings have been supplied to the food processor in flattened condition, cut to predetermined lengths of from about 0.6 to about 2.2 m. More recently, however, but prior to the time of this invention, large size casings of both the fibrous and the unsupported types have been and are being supplied in the form of shirred sticks containing up to about 65 m of casings for stuffing with high speed apparatus.

CASING MOISTURE CONTENT

In the preparation and use of artificial food casings, control of the moisture content of the casings is of importance. While the shirred cellulosic casing sticks of the type used in this invention should have a moisture content of at least about 13% of total casing weight, the moisture level may be higher.

When small size regenerated cellulose casings are produced, it is generally preferred that they have a water content in the range of about 14% to about 18% by weight of total casing to enable stuffing operations to be carried out without damage to the casings. This relatively narrow range of moisture content is also important because excessive breakage of the casing during stuffing has been found to occur at lower moisture contents, and greater moisture content results in excessive plasticity of the casing material and consequent overstuffing.

The large size casings as described hereinabove have recently been improved to the extent that shirred and compacted casing lengths are available in premoisturized condition so that the long used and troublesome step of soaking such casings immediately prior to the stuffing operation has now been eliminated. The moisture contents of the larger size casings of the fibrous reinforced variety, when they are furnished in shirred and premoisturized condition, are usually found to be in the range of from about 16% to about 35% moisture by total casing weight.

The specific moisture content may be selected to accommodate the requirements or preferences of the user. If the moisture content is high and a long storage period is contemplated before stuffing, steps to prevent mold or bacterial growth are advisable. One approach consistent with the invention is to limit the activity of the water added prior to or during stuffing with sufficient amounts of such solutes as propylene glycol or glycerine. These also usefully function in casings to be shirred and compacted as plasticizers or humectants.

THE SHIRRING PROCESS

Shirring techniques for the casings described hereinabove in accordance with patent references noted, as well as with others, can be generally described as involving the continuous feeding of a length of flat casing feed stock, from a reel for instance, into a shirring machine where it is inflated with low pressure gas, usually air. The inflated casing is passed through an array of shirring rolls which pleat the casing up against a restraint on or about the shirring mandrel until a preselected shirred length has been attained. For a floating mandrel type of shirring machine, such as described in U.S. Pat. No. 3,766,603 for example, the shirred casing is then transferred linearly past or away from the restraint against which the shirring was performed and onto an extended mandrel portion whereon it is compacted into a desired stick length. For a withdrawing mandrel shirring machine such as described in U.S. Pat. No. 2,583,654 for example, the shirring mandrel with the shirred casing remaining thereon is rotated to an alternate position where the shirred casing is compacted to the desired stick length.

The normal compaction results in a stick length which may be from about 1.0 percent to about 1.2 or 1.3 percent of the original casing length.

The ratios of original casing length to shirred stick length, referred to as "pack ratio", have been generally in the order of 70 to 100 throughout the industry, prior to the time of the present invention.

Packing efficiency is another way of quantitatively expressing the extent to which original casing lengths are compacted in the shirred stick form. Packing efficiency is defined as the ratio of the volume of the shirred and compacted casing in a unit length divided by the volume of the same unit length which would be occupied by solid casing material, and it may be determined by the following relationship:

$$PE = \frac{L_c \times (2 \times FW \times t_c)}{\frac{\pi}{4} (OD^2 - ID^2) \times L_s}$$

where
PE = Packing Efficiency
$L_c$ = casing length
$L_s$ = shirred casing stick length
FW = casing flat width
$t_c$ = casing wall thickness
OD = shirred casing stick outer diameter
ID = shirred casing stick inner diameter This computation automatically takes into account the specific gravity, and/or density of the casing material itself. Inspection of the relationship shows that the ratio is actually the volume of the casing flat stock which is contained in the shirred casing stick, divided by the volume of a hollow cylinder having the same dimensions as the shirred casing stick. The extent to which packing efficiency increases is thus measured by the closeness of its approach towards one (1), unity.

Since pack ratio is the ratio of $L_c$ to $L_s$, another way to express the packing efficiency relationship is as follows:

$$PE = (\text{Pack Ratio}) \left[ \frac{2 \times FW \times t_c}{\frac{\pi}{4} (OD^2 - ID^2)} \right]$$

It can be seen that for a given packing efficiency, the pack ratio varies with the difference between the outside diameter and the inside diameter of the stick of a given size casing. Further, since the outside diameter is necessarily limited by the flat width (FW) of the casing used to form the stick, increasing the diameter difference to increase the pack ratio must decrease ultimately the size of the bore or inside diameter. While the objectives of maximum stick bore and maximum pack ratio work against each other, the fact remains that packing efficiency is maximized at a given pack ratio when the stick inside diameter is maximized.

It is usually desirable to utilize the maximum bore size (internal cross sectional area) stuffing horn with a given casing size, in part to maximize throughput and minimize stuffing pressure. Another reason to maximize the horn size is to eliminate the danger of "fatting out". Fatting out is a phenomenon which arises when the passage of the meat emulsion through a stuffing horn at a high shear rate causes the emulsion to break down and allows water and fat to separate out. The water and fat thereafter accumulate between the surface of the finished sausage product and the cellulosic food casing during processing, to thereby produce an unsatisfactory sausage product having an unacceptable visual appearance. The shear rate decreases with increasing stuffing horn inner diameter.

The goals that have been sought in shirring technology have been to produce a casing stick which can be deshirred and stuffed on a stuffing apparatus, continuously, with no mechanical defects or breakdowns so as to insure continuous production, the stick itself having sufficient structural and mechanical integrity, i.e. coherency, to withstand the ordinary rigors of packaging, storage, handling and placement on the stuffing apparatus, and, in addition, the desideratum of compacting as much stuffable casing into a given stick length as is technically feasible for use on a stuffing horn of maximum possible bore size.

Accordingly, the "ideal" casing stick is one of high coherency, balancing a long length of casing per unit stick length (high pack ratio) and a large inner diameter or bore size (high packing efficiency).

A typical prior art pack ratio and packing efficiency may be calculated from the teachings of U.S. Pat. No. 3,528,825 to Doughty. Referring to column 5, line 75 through column 6, line 5, we find the description of a shirred casing stick in which 95 feet (30 meters) of casing having an inflated outside diameter of 22/32 inch (1.75 cm) with a wall thickness of 0.001 inch (0.0254 mm) is shirred into a stick having an O.D. of ⅞ inch (2.22 cm), an I.D. of ½ inch (1.27 cm), and a stick length of 16¼ inches (41.28 cm). Using those data and the above formula for packing efficiency, it will be found that the prior art casing illustrated in Doughty had a packing efficiency of 0.374. The pack ratio of this prior art casing was 70; 95 feet (30 meters) shirred and compacted to 16¼ inches (41.28 cm).

Coherency of a shirred casing stick is determined by measuring the bending moment in inch-pounds at the breaking of a stick. A casing stick is cradled on two V-notched support brackets secured on a base plate and spaced apart a distance (D) about 80% to 90% of the length of the casing stick being tested. A pressure member having V-notched struts spaced apart a distance of D less 4 inches is centrally lowered onto the top of the casing stick. A downward pressure is provided by manually operated handle, rack and pinion linkage to a force gauge (such as Hunter Force Indicator, Model L-IM with a "Hold at Maximum Device") that is secured centrally to the pressure member. The force is increasingly applied until the casing stick breaks. The force reading P in pounds is noted. The bending moment in inch pounds at break on the apparatus is equal to P/2×2 inches, and thus the force reading P equates to inch-pounds of bending moment to break the casing stick. In general, a coherency of at least about 1.2 inch-pound is required and a coherency of at least about 2.5 inch-pounds is especially suitable and preferred.

Since the relationship of usuable casing stick bore diameter with respect to stuffing horn diameter is a most meaningful measure of casing article functionality, a "drop fit" test has been developed for use with shirred casing articles. To simulate the placing of a shirred stick on a stuffing horn and thereby measure the effective internal diameter of the shirred stick, a test was designed wherein a shirred stick is placed over the upper end of a vertical stainless steel rod of longer length than the shirred stick and allowed to freely fall under its own weight completely around said rod to its lower end. More particularly, the rod may be vertically positioned on a table. The shirred stick is placed over the rod upper end and then released. If the stick falls to the table surface, the drop fit test is successful. Rods are available in diameter increments of 0.010 inches, and for certain casing size ranges, rods have been fabricated in 0.002 inch increments. The shirred stick is tested on each rod beginning with the smallest rod and on each succeeding size rod until the shirred stick will not freely fall over the entire length of the rod. The largest diameter rod over which the stick freely falls for its entire length is the effective internal diameter of said shirred stick, i.e., the "drop fit" diameter.

In the manufacture of shirred cellulosic casing sticks, the individual sticks vary slightly in bore size, in part due to irregularities in extensions of pleats within the stick bore. For this reason, for experimental work, it is necessary that multiple shirred sticks, e.g., at least about 10, be measured for drop fit and the arithmetic average used to determine functionality of the entire group in terms of the stuffing horn fit. As previously indicated, drop fit averages are preferably to the thousandth of an inch, and a drop fit requirement is defined to this degree of accuracy. For example, if the requirement is 0.490 inch minimum, an average drop fit of 0.489 inch would be unacceptable, since a significant number of sticks in the group represented by the 0.489 inch average drop fit measurement would not be functional on a 0.490 inch diameter stuffing horn.

One of the most important factors in the shirring of small size food casing is the quality of coherency, i.e. the durability of the shirred stick as a self-sustaining article. Stick coherency is especially important in effecting the suitability of such sticks for use with automatic food stuffing equipment, as, for example, the machinery employed in the preparation of products such as frankfurters and other similar food articles. A disjoinder or break in a shirred stick prior to mounting it on a stuffing horn makes the stick unsuitable for use on such automatic stuffing equipment. Accordingly, any treatment of the tubular food casing which may be formed into a shirred casing stick must not detrimentally affect the stick coherency, and furthermore, should be directed more towards enhancing it.

Significant effort in recent years has been expended in the casing industry, particularly for the small size casings, to develop systems for producing highly coherent casing sticks. These have included chemical treatments as disclosed, for example, in U.S. Pat. No. 4,137,947, among others.

Conventional shirring on modern shirring machines produces shirred casing sticks with a discernible angular displacement between a plane normal to the longitudinal axis of the stick and a plane in which a shirred pleat lies. This is called the pleat angle. A conventional shirred stick without the core element of this invention, having a pleat angle of this nature, has a coherency and structural integrity which is significantly greater than that of a stick of the same type which has been shirred with the pleat normal to the longitudinal axis of the stick, since the overall stick length is somewhat like a stack of interconnected nesting cones.

We have discovered, particularly for the smaller size casings used to make frankfurter type products, that when a conventional shirred stick (uncored) is highly compacted in an effort to maximize its pack ratio, the coherency or structural integrity of the compressed stick deteriorates to a point whereby the stick is rendered nonfunctional. That is, the stick is rendered fragile, is easily broken, and therefore cannot be mounted on a stuffing horn. It is speculated that this effect occurs when the high longitudinal compressive forces tend to flatten out the "nesting cone" geometry produced during the shirring process.

We have also discovered that when tubular casing is subjected to the shirring process (i.e. transformed from a flattened tubular form to a folded and compacted stick form as previously described), high inward radial forces are developed within the resulting shirred stick when high packing efficiencies are achieved. The magnitude of these high forces became evident when shirred casing sticks were highly compacted on tubular core elements of the present invention and it was found that substantially rigid cores would lose some core diameter with time. It was previously known that the inner diameter of conventional shirred sticks (without a tubular core) show a sharp reduction upon doffing (removal) from the shirring mandrel immediately after compaction, and a more gradual additional reduction which appears to continue for about one week or more after doffing. We have further discovered that the magnitude of these radial inward forces is proportional to the longitudinal compacting force used to compress the stick to the initial compressed length which the stick has just prior to doffing. That is, the radial inward forces increase when the longitudinal compacting force increases.

A principal object of this invention is to provide a shirred casing stick article of high coherency with casing shirred and compressed to a higher pack ratio than heretofore practically attained in the art, while maintaining an acceptable bore size, as evidenced by a high packing efficiency.

Another object of the present invention is to provide a high coherency shirred casing stick article with high pack ratio and high packing efficiency of a generic structure and type which is broadly useful across the entire spectrum of casing sizes and types used in the food industry.

A further important object of this invention is to provide a high density shirred casing stick article having a pack ratio coupled with a packing efficiency which are both significantly higher than that achievable in the casing industry to date, while at the same time eliminating all potential problems associated in the prior art with lack of structural integrity or coherency.

Another important object of the present invention is the provision of a cored high density shirred casing stick article with a core which has suitable physical properties to oppose the high inward radial forces developed when a tubular casing undergoes the shirring process and is subsequently compacted to a high pack ratio.

It is a further object of the invention to provide a method for manufacturing cored high density shirred casing stick articles on presently available shirring machinery with only slight, if any, modifications thereto to produce the article according to the invention.

It is a still further object of the present invention to provide a casing article with a combination of a larger bore and higher pack ratio than can be achieved with an uncored product.

Another important object of the invention is the provision of a cored high density shirred casing article, through which specific standard casing sizes over all casing size ranges, will be enabled to fit onto respectively larger stuffing horns than heretofore possible. The contribution which the shirred casing article of the present invention thereby makes to the technology comprises a more efficient packaging operation for the stuffing of food articles of all types into available casings.

A particular object of one aspect of the invention is to provide a cored high density shirred casing stick article wherein the core replaces the horn of the stuffing machine and thereby becomes a consumeable element of the stuffing machine.

An additional particular object of the invention is to provide a cored high density shirred casing stick article, the core element of which may be used selectably as a carrier tube for slipping over a stuffing horn on a stuffing apparatus or, alternatively, as the stuffing horn itself, having a sizing means of one type or another mounted on the core element of the article and disposed internally of a deshirred portion of the shirred casing.

BRIEF DESCRIPTION OF THE INVENTION

In contrast to the early use of cores, we have discovered a new use for cores wherein they are designed to restrict the effects of the shirred casing radial inward force to such an extent that not only do we achieve pack ratios which are significantly higher than achieved in the prior art (uncored shirred sticks compacted and shirred under the same conditions), but these higher pack ratios can be attained with casing articles of equivalent or even greater usable bore sizes than possible with the aforementioned comparable uncored shirred sticks. This was contrary to the expectations of one skilled in the art, that is, that a core would take up space and thereby reduce the effective bore of the casing stick. Accordingly, one would expect that a core would have a negative effect on pack ratio. Contrary to this expectation, the cored high density cellulosic casing article of this invention can provide a substantially higher pack ratio with no reduction in the useable bore size, and thus can result in a cored shirred casing article which has a packing efficiency that is higher than the packing efficiency of an uncored shirred stick. An added feature of the inventive article is that it provides a casing article of enhanced structural integrity and strength.

In one embodiment which is particularly useful with stuffing apparatus for the packaging of chunk meat articles such as whole boneless hams and the like, the core itself of the article according to the invention is used in place of a stuffing horn. It should be noted, however, in this connection, that the stuffing apparatus for whole boneless hams is considered to be a separate invention, the invention in this present case being only the adaptation of the cored high density concept to such apparatus. It should be further noted that such apparatus is the subject matter of a copending application, Ser. No. 261,313, now U.S. Pat. No. 4,467,499 and which is assigned to the same assignee as this application.

An additional embodiment of the invention provides a cored high density shirred casing stick article, the core element of which may be used selectably as a carrier tube for slipping over a stuffing horn on a stuffing apparatus or, alternatively, as the stuffing horn itself, having a sizing means of one type or another mounted on the core element of the article and disposed internally of a deshirred portion of the shirred casing.

In general, the invention comprehends the combination of a tubular core, a controllably moisturized cellulosic food casing length having a moisture content of at least about 13 percent by total casing weight, shirred and highly compacted on said core to a high pack ratio and to a packing efficiency not less than about 0.50, and also respectively greater than the pack ratio and packing efficiency of said same casing length shirred and highly compacted under the same shirring and compacting conditions without said core, thereby generating high casing inward expansion force. Another aspect of this inventive combination is that the core is sufficiently rigid to resist deformation and reduction of the core bore size from the high casing inward expansion force. For purposes of this comparison between cored and uncored shirred and compacted casings, the uncored casing article has no external longitudinal restraint.

As used herein, the expression "same shirring and compacting conditions" means that the shirring method and apparatus (for example, including shirring means and diameter of the shirring mandrel) and the final compaction method, apparatus, and length as compacted or compaction force, are essentially the same.

In preferred practice of the invention, the packing efficiency is kept at 0.60 and higher.

In a preferred embodiment of this coherent casing article, based on a drop fit comparison (hereinabove discussed in detail) the core has an inner bore size at least as large as the inner bore size the same casing would have when shirred and highly compacted under the same shirring and compacting conditions without the core. In one preferred embodiment, the casing is the small unreinforced cellulose type having an inflated diameter of less than about 40 mm., and compacted to a pack ratio of at least 100.

In its method aspects, the present invention comprehends a method for manufacturing a shirred and highly compacted cored casing article comprising the steps of: (a.) providing a cellulosic food casing length having a moisture content of at least about 13 percent of total casing weight; (b.) sliding the bore inner circumference of said cellulosic food casing length over a first end of a mandrel having a reduced diameter end portion at the second mandrel end; (c.) shirring said cellulosic food casing length on said mandrel; (d.) providing a hollow core coaxially arranged with and contiguous to the mandrel reduced diameter end portion, said core being sufficiently rigid to resist deformation and reduction of the core bore size from casing inward expansion force due to casing compacting; (e.) linearly moving the shirred casing length along the mandrel onto the outer surface of the coaxially arranged core; and, (f.) compacting the shirred casing length on said core to a high pack ratio and to a high packing efficiency, thereby generating said casing inward expansion force.

An alternate embodiment of the present invention comprehends a method for manufacturing a shirred and highly compacted cored casing article comprising the steps of: (a.) providing a cellulosic food casing length having a moisture content of at least about 13 percent of total casing weight; (b.) sliding the bore inner circumference of said cellulosic food casing length over a first end of a mandrel; (c.) shirring and compacting said cellulosic food casing length on said mandrel; (d.) providing a hollow core, which is preferably coaxially arranged with and contiguous to the mandrel second end, said core being sufficiently rigid to resist deformation and reduction of the core bore size from casing inward expansion force due to casing compacting; and, (e.) linearly moving the shirred and compacted casing length from the mandrel second end onto the outer surface of the core, so as to provide a high pack ratio and a high packing efficiency, thereby generating said casing inward expansion force as the shirred stick bore contracts.

Another method embodiment of this invention involves a method for manufacturing a shirred and highly compacted cored casing article comprising the steps of: (a.) providing a cellulosic food casing length having a moisture content of at least about 13 percent of total casing weight; (b.) sliding the bore inner circumference of said cellulosic food casing length over a first end of a mandrel; (c.) shirring said cellulosic food casing length on said mandrel; (d.) providing a hollow core sufficiently rigid to resist deformation and reduction of the core bore size from casing inward expansion force due to casing compacting; (e.) moving the shirred casing length from the mandrel second end onto the outer surface of the core; and, (f.) further compacting the shirred casing length on said core to a high pack ratio and to a high packing efficiency, thereby generating said casing inward expansion force. In this embodiment, the core is, preferably, supported on a second mandrel, and the shirred casing length is transferred onto the core and the second mandrel for compression into the fully compacted condition. Additionally, the mandrel supported shirred casing length may be moved to a secondary position before the shirred casing length is moved from the mandrel second end onto the core. Preferably, the core is coaxially arranged with and contiguous to the mandrel second end.

An additional embodiment of the present invention constitutes a method for manufacturing a shirred and highly compacted cored casing article comprising the steps of: (a.) providing a cellulosic food casing length having a moisture content of at least about 13 percent of total casing weight; (b.) providing a hollow core sufficiently rigid to resist deformation and reduction of the core bore size from casing inward expansion force due to said compacting; (c.) providing a mandrel and longitudinally sliding the bore inner circumference of said core over the outer circumference of said mandrel; (d.) longitudinally sliding the bore inner circumference of said cellulosic food casing length over the outer circumference of said core; (e.) shirring said cellulose food casing length on said core and mandrel; (f.) compacting the shirred cellulose food casing length on said core to a high pack ratio and to a high packing efficiency, thereby generating said casing inward expansion force; and, (g.) longitudinally sliding the shirred and highly compacted cored casing article off said mandrel.

A further method embodiment of the present invention encompasses a method for manufacturing a shirred and highly compacted cored casing article comprising the steps of: (a.) providing a cellulosic food casing length having a moisture content of at least about 13 percent of total casing weight; (b.) sliding the bore inner circumference of said cellulosic food casing length over a first end of a mandrel; (c.) shirring said cellulosic food casing length on said mandrel; (d.) compacting the shirred casing length on said mandrel to a high pack ratio, and to a high packing efficiency; (e.) providing a hollow core sufficiently rigid to resist deformation and reduction of the core bore size from casing inward expansion force due to casing compacting; and, (f.) longitudinally sliding the compacted shirred casing length off of the mandrel first end and over the outer circumference of said core, so as to provide a high pack ratio and a high packing efficiency, thereby generating said casing inward expansion force as the shirred stick bore contracts.

A still further method embodiment of the present invention embraces a method for manufacturing a shirred and highly compacted cored casing article comprising the steps of: (a.) providing a cellulosic food casing length having a moisture content of at least about 13 percent of total casing weight; (b.) sliding the bore inner circumference of said cellulosic food casing length over a first end of a mandrel; (c.) shirring said cellulosic food casing length on said mandrel; (d.) providing a hollow core sufficiently rigid to resist deformation and reduction of the core bore size from casing inward expansion force due to casing compacting; (e.) moving the mandrel-supported shirred cellulosic food casing length to a secondary position, preferably into linear and coaxial alignment with said core; (f.) moving the shirred casing length from the mandrel first end onto the outer surface of the core; and, (g.) further compacting the shirred casing length on said core to a high pack ratio and to a high packing efficiency, thereby generating said casing inward expansion force. In this embodiment, the core is preferably, supported on a second mandrel, and the partially compacted casing stick is transferred onto the core and the second mandrel for compression into fully compacted condition.

The particular moisture content preferred for different types of casing may vary. More specifically, the moisture content of controllably moisturized shirred fibrous casings in the larger size range would preferably be in the order of from about 16 percent to about 35 percent by total casing weight.

The preferred range of moisture content for the intermediate size casings will also be in the order of from about 16 percent to about 35 percent moisture by weight of total casing.

The smaller size casings used to make frankfurter type products and the like will be advantageously provided with moisture contents by weight of total casing in the order of from about 14 percent to about 18 percent.

The tubular core element of an article according to the invention must be sufficiently rigid to resist deformation and reduction of the core bore size from the casing inward expansion force, recognizing that slight deformation and bore reduction will occur but will be acceptable if not excessive. For example, the inside or bore diameter of the tubular core can be reduced from about 1.9% to about 6.7% by the casing inward expansion force. Core diameter may vary from about ⅛ inch to 5.0 inches or greater, depending upon the casing size and the required bore size. It may vary in wall thickness to suit the particular casing article and its adaptation and utilization, and further in accordance with the core material used, but, in general, it may be stated that the wall thickness of such tubular core is in the range of from about 0.020 inches (0.051 cm) to about 0.100 inches (0.254 cm). It also may be stated that the bore or inside diameter of the tubular core for use in the casing article should be about 10 to 60 times greater than the wall thickness of the core. That is the ratio of the core bore to its wall thickness should be in the range of from about 10:1 to about 60:1.

DETAILED DESCRIPTION OF THE INVENTION

The invention will now be described in greater particularity and with reference to the drawings appended to this specification wherein:

FIG. 5 is an illustration of a variation of the invention adapted for use as a stuffing horn element on stuffing apparatus for the processing of chunk meat products;

FIG. 5A is a view on an enlarged scale showing in schematic fashion a section of the tubular wall of the casing article of FIG. 5;

FIG. 6 is an isometric view of an article embodiment according to the invention particularly useful in the stuffing of mid-range size products wherein the core element may be used as a support to be slipped over a stuffing horn or alternatively as the stuffing horn portion of the apparatus itself;

FIG. 8 is a graph showing drop fit as a function of pack ratio for uncored and cored shirred sticks formed from 160 feet of size 25 small diameter nonfibrous casing;

FIG. 9 is a graph showing coherency as a function of pack ratio for uncored shirred sticks formed from 160 feet of size 25 small diameter nonfibrous casing;

FIG. 10 is a graph showing drop fit as a function of pack ratio for uncored shirred sticks formed from sizes 17, 21 and 27 small diameter cellulose casing (without fibrous reinforcement) with all sticks of a particular size having the same length;

Figure 1:
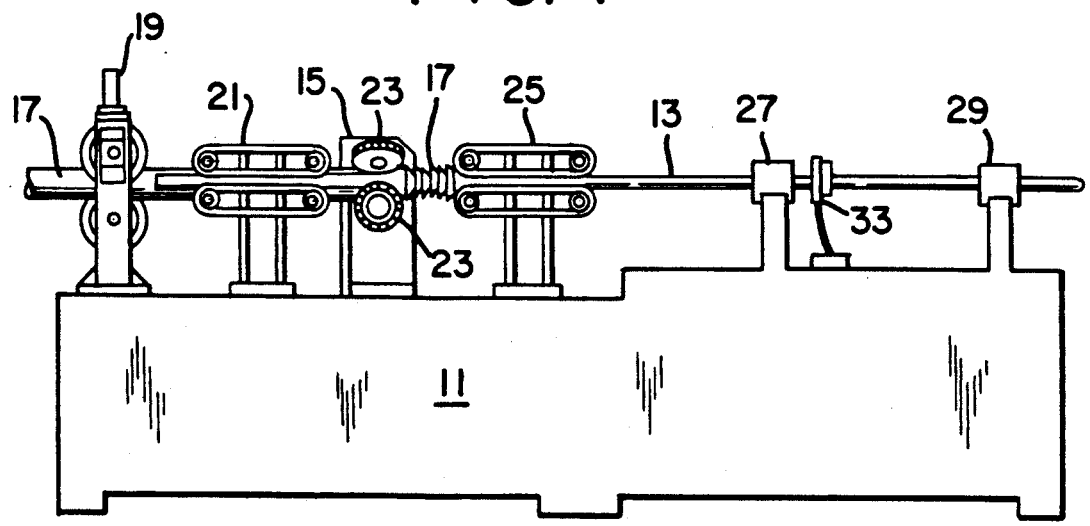
FIG. 1 is an elevational view of one apparatus which may be used to produce an article according to the invention and in accordance with one inventive method, showing the shirring process in relationship to a continuously fed length of casing material.
Figure 2:
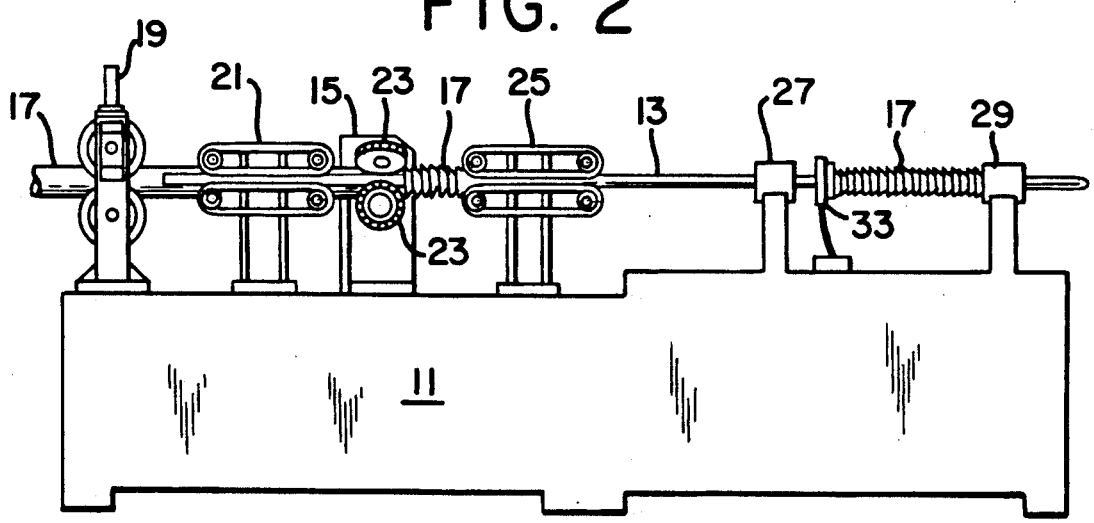
FIG. 2 shows the shirring operation completed and with the shirred casing length transported to the compacting section of the apparatus of FIG. 1.

Referring now to the drawing, there is shown in FIGS. 1 and 2 a typical floating mandrel-type shirring machine designated generally as 11, comprising a shirring mandrel 13 extending through a shirring head 15. An inflated cellulosic casing 17, which can be a fibrous casing is fed onto the mandrel 13 by a pair of feed rolls 19 and a pair of cooperating feed belts 21. The shirring head 15 comprises a multiplicity of shirring wheels 23, usually three, through which the inflated casing 17 passes, which shirr said casing in conjunction with holdback belts 25 in a manner well known to those familiar with the art. The shirring wheels are of a general type which is described in U.S. Pat. No. 3,461,484.

The advance of the shirred casing 17 on the mandrel 13 is retarded by an array of holdback belts 25 in order to provide a substantially regular pleat formation and a partially compacted shirred casing. After the initial shirring and pleating action, the casing is transferred by the holdback belts further down the mandrel and towards a first clamp 27.

Figure 3:
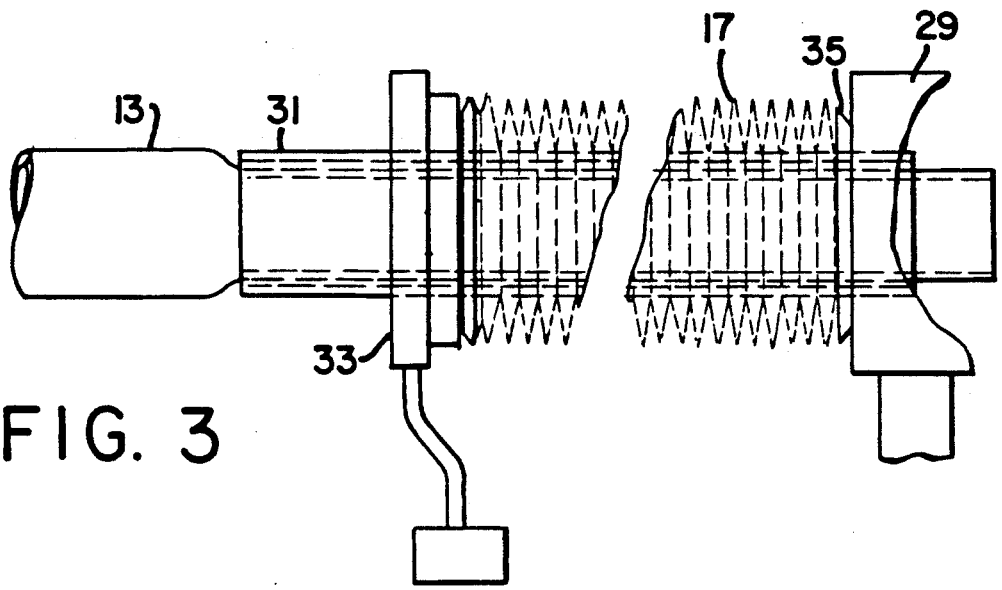
FIG. 3 shows the application of the compacting force to produce the stick length according to the invention on a core element mounted on the shirring machine extended portion.

To effect the transfer of the shirred casing onto the substantially rigid hollow tubular core and its ultimate compaction thereon in accordance with the invention, first clamp 27 is swung out of the way and a shirred length is moved manually, or by any conventional automatic means, to the position shown in FIG. 2 of the drawing, up against the second clamp 29. In this position, the shirred casing length is arranged on a hollow tubular core 31 disposed on a necked down or reduced section of the mandrel 13, as shown in FIG. 3 of the drawing which is an enlarged detail of the right hand side of the illustration of FIG. 2. The final compaction of the casing 17 on hollow tubular core 31 is effected by compactor 33 which moves linearly towards second clamp 29 until the desired shirred casing stick length is achieved. A holding disc 35 or washer may, advantageously, be inserted between the end of casing 17 and the second clamp 29 so that when the unit article is removed, the casing will be securely held on the hollow tubular core and restrained against slipping off the end thereof.

When a cored high density casing article is completed as described in the foregoing steps, second clamp 29 is removed from its restraining position, and the finished article removed.

The article of this invention may, for example, be assembled by transferring the shirred and partially compacted casing onto its hollow tubular core 31 in the manner described hereinabove. FIG. 3 of the drawing shows the shirred and partially compacted casing length moved linearly onto a core which is coaxially arrayed with the shirring mandrel 13, on a reduced diameter portion thereof, and then applying the ultimate compacting force by means of a compactor 33.

Other methods may be used for placing shirred casing on a core. For example, on a floating mandrel-type shirring machine such as that previously described, the shirred casing may be fully compacted over the shirring machine mandrel and subsequently doffed onto a tubular core. It is also possible to remove the shirred and partially compacted casing length completely from the shirring apparatus 11 on a transport rod or carrying mandrel and move the entire length to a separate compacting apparatus where the shirred casing length would be placed on a core and compacted. Alternatively, the core may be placed on the floating mandrel and then positioned thereon so that the casing is shirred on the core, the cored shirred casing is then fully compacted on the core, and the cored fully compacted casing stick is then doffed (removed) from the mandrel.

Another shirring system, involving use of a withdrawing mandrel shirring machine is described in U.S. Pat. No. 2,583,654. This type of shirring system may be used in the manufacture of the inventive article, and it allows the shirring of the casing directly onto a core for subsequent compaction thereon. In one embodiment, the core is placed on the withdrawing shirring mandrel and is positioned thereon so that the casing is shirred on the core, the cored shirred casing is then fully compacted on the core, and the cored fully compacted casing stick is then doffed from the mandrel. In an alternative embodiment, the casing may be shirred and compacted on the withdrawing mandrel in the conventional manner and the shirred and compacted casing may be slid off of the mandrel and onto the core. In a further embodiment, the casing may be shirred and partially compacted on the withdrawing mandrel, the mandrel is then moved to a new position coaxial with the core, the partially compacted shirred stick is slid off of the mandrel and onto the core, and the shirred stick is then fully compacted on the core. It is also possible to remove the shirred and partially compacted casing length completely from the withdrawing mandrel shirring apparatus by doffing onto a transport rod or carrying mandrel and then transferring the partially compacted shirred stick from the transport rod or carrying mandrel onto the core which is mounted in a separate compacting apparatus, where the shirred stick is then fully compacted on the core.

The attainment of maximum potential pack ratio with the inventive article requires a high compaction force which, in turn, induces high inward radial forces within the shirred casing stick. Since the preferred method of preparing the inventive article involves compacting the shirred casing while in place on its core, it will be appreciated that a low coefficient of friction between the casing and core is desirable. Example VII (discussed hereinafter in detail) illustrates that a higher pack ratio may be obtained with a core material such as high density polyethylene having a relatively low coefficient of friction, as compared with polypropylene or polystyrene which have higher coefficients of friction.

Figure 4:
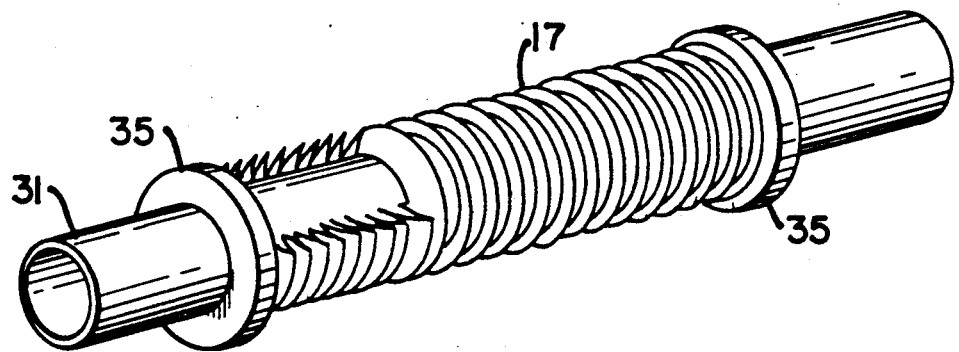
FIG. 4 is an isometric view of an article according to the invention showing the shirred and compacted casing in place on a hollow tubular core.

FIG. 4 of the drawing shows an article in accordance with the invention, specifically, a moisturized cellulosic food casing length 17, shirred and compacted on a substantially rigid tubular core 31 to a pack ratio and a packing efficiency higher than heretofore conventionally attained. Also shown in FIG. 4 are holding discs 35 which may optionally be arranged and disposed at each end of the shirred casing length to retain it in its compacted condition on the core.

FIG. 5 of the drawing shows one presently preferred embodiment of cored high density shirring applied to the demountable stuffing horn which is the subject of a currently pending application of Beckman et al, Ser. No. 261,313, now U.S. Pat. No. 4,467,499 and assigned to the same assignee as this Application. In this embodiment, a tiltable casing holdback element 37 is shown mounted on the hollow tubular core 31, disposed interiorly of a deshirred length of the casing 17 which has been pulled from the shirred and compacted casing length, over the tiltable casing holdback element and the end of the tubular core/ stuffing horn, where it may be clip-closed to provide an end closure for the product to be stuffed. Closing the deshirred length of casing 17 in this fashion produces an annular air space which is defined between the deshirred length and the outer surface of the tubular core 31 and which extends for a substantial length ahead of the shirred casing on the tubular core to the fore end of the tubular core. A flange 39 is provided, as shown at the opposite end of the combination article, to facilitate attachment of the article to the stuffing apparatus. In this embodiment, casing 17 preferably is a fibrous casing such as shown in FIG. 5A. As is known in the art, a fibrous casing is a cellulosic casing having a fibrous support web 50 embedded in the casing wall.

FIG. 6 of the drawing shows the cored high density article according to the invention adapted to a casing carrier or support sleeve to be slipped over the stuffing horn of a stuffing apparatus. When used in this manner, a flange 39 on such article may be connected to apparatus on the stuffing machine which provides for the reciprocal movement of the entire sleeve to effect slacking operations when required in the stuffing process. An embodiment closely similar to that shown in FIG. 6 of the drawing may, alternatively, be used as a sleeve which includes a sizing or holdback element, in which case, a deshirred portion of the casing would be pulled over the sizing or holdback element and the end of the tubular core, and clip-closed to retain product being stuffed.

Figure 7:
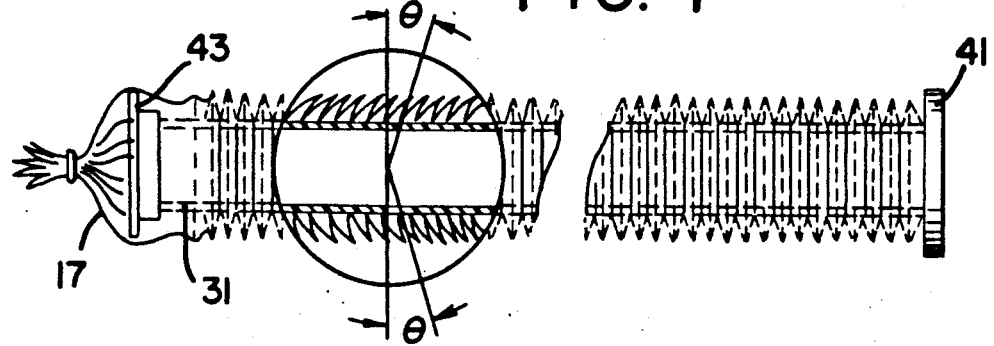
FIG. 7 is a view of an article in accordance with the invention useful in the stuffing manufacture of small size sausage products wherein the core element replaces the stuffing horn on the stuffing apparatus.

FIG. 7 of the drawing shows an article in accordance with the invention adapted for use in the stuffing manufacture of small size sausage products, provided with a mounting adaptor 41 arranged and disposed to fit directly onto a stuffing machine, the hollow tubular core 31 of the article thus supplanting the conventional stuffing horn. In this instance, the casing 17 is partially deshirred, pulled over a sizing element 43 and the end of the tube-horn where it is closed to provide sealing against the product stuffing operation. As in the FIG. 5 embodiment, the deshirred casing 17 defines an annular air space between it and the tubular core 31, which air space extends a substantial length from the fore end of the tubular core back to the shirred casing. It is particularly advantageous to provide long lengths of casing in a given stick length for the stuffing of small size sausage products, since the production of such products is largely accomplished on high speed automatic stuffing apparatus. Use of the inventive cored casing article permits use of substantially longer casing lengths within a given stick length for more efficient operation of such equipment and, at the same time, meets the high precision dimensional requirements (e.g. straightness) and structural integrity (coherency) demanded of casing articles to be used on such equipment.

Whether the tubular core is to be used as a stuffing horn or as a support sleeve to be slipped over the stuffing horn, FIGS. 5, 6 and 7 all show that the tubular core has a substantially straight bore and has a wall which is imperforate and substantially uniform in thickness throughout its length.

FIG. 7 of the drawing also illustrates the pleat angle $\theta$ of the casing in the shirred stick form according to the invention. Conventional shirring on modern shirring machines produces shirred casing sticks with a discernible angular displacement between a plane normal to the longitudinal axis of the stick and a plane in which a shirred pleat lies. An uncored stick having a pleat angle of this nature has, it has been found, significantly greater coherency and structural integrity than such a stick of the same type would have if shirred with the pleat angle normal to the longitudinal axis of the stick, since the overall stick length is somewhat like a stack of nesting cones. The core element provides sufficient structural rigidity so as to remove reliance upon the pleat angle for coherency.

One reason to include some pleat angle $\theta$ in casing sticks, according to the invention, is to retard longitudinal stick growth. Shirred casing sticks, immediately after they are doffed from the shirring and/or compacting mandrel, tend to evince growth, which is the tendency of an unrestrained, shirred and compacted stick to elongate. In the case of uncored shirred and compacted sticks, there is the further growth of the pleated casing radially inwardly into the bore of the stick, a phenomenon which is increased in proportion to the extent to which longitudinal stick growth may be restrained.

The tendency of a shirred and compacted stick to grow radially inward against the core produces an added locking effect of the casing pleats against the core outer surface. With this advantageous effect, the tendency of a finished shirred casing stick to grow longitudinally is substantially reduced by pleat to pleat friction combined with pleat to core frictional force so that only minimal additional longitudinal restraint is required to dimensionally stabilize the casing stick article.

As will become apparent from the following examples, there also is a contraction of the tubular core resulting in a reduction of its bore diameter. This reduction results in an inside diameter of the tubular core which is about 1.9% to about 6.7% smaller than the inside diameter of the tubular core as formed and without the shirred casing in place on the core. Data for calculating the percentage of bore reduction for casing articles according to the present invention is contained in the following Examples I-III, VI-VIII and XI. In this respect, the percentage can be determined in each case by subtracting the figure given as the one week drop fit of the casing article from the figure given as the inside diameter of the tubular core as formed (i.e. before placement of the casing on the core) and then dividing the result by the latter figure.

EXAMPLE I

A 250 foot (76.22 meters) length of large size fibrous casing, trade designation size 10, having an average flat width of 7.55 inches (19.18 cm) and a wall thickness of 0.0040 inch (0.10 mm) was shirred using a shirring means very similar to that described in U.S. Pat. No. 3,461,484 (Arnold). The casing had a moisture content of about 20 wt.% based on total casing weight. As is conventional, a mineral oil lubricant was used. Internal oil was used to reduce mandrel friction and external oil was used for preventing damage to the casing being shirred and undue wear of the shirring rolls. The mineral oil lubricant was applied internally at a rate of about 180 mg. of oil per 100 in.$^2$ of casing surface, and externally at a rate of about 100 mg. of oil per 100 in.$^2$ of casing surface, which amounts had no discernable adverse effect on the finished stick properties. The casing was compacted from one end onto a high density polyethylene core tube having an inside diameter of 3.75 inches (9.53 cm) and a wall thickness of 0.062 inch (0.16 cm) to a shirred stick length of 23.0 inches (58.42 cm). The subject casing article was prepared on a floating mandrel-type shirring machine in a manner described hereinabove wherein the shirred casing is transferred, after shirring and lightly compacting onto a core coaxially arrayed with the shirring mandrel on a reduced diameter portion thereof, finally compacted in place on the core, and doffed. This produced a cored high density shirred casing stick article according to the invention having a pack ratio of 130.4 and a packing efficiency of about 0.757.

For comparison to a control sample, a standard commercially available 150 foot length of the same size and type of casing was shirred and compacted to the same shirred stick length of 23.0 inches without a core and found to have a pack ratio of 78 and a packing efficiency of 0.390, with a bore I.D. of 3⅜ inches. Other uncored control samples having a higher pack ratio and packing efficiency provided nonfunctional articles because of excessive bore reduction due to inward radial growth.

EXAMPLE II

The fact that very high inward forces at the bore of the casing stick are generated as the result of the shirring process was demonstrated by experimental work involving the shirring and compacting, to high pack ratio and high packing efficiency, of samples of size 25 (0.83 inch or 21 mm inflated diameter) small size cellulose casing (without fibrous reinforcement) having a casing wall thickness of about 0.001 inch (0.0254 mm). In the experimental work, 84 foot (25.61 meters) lengths of the size 25 cellulose casing, about 5 samples each, were shirred using a shirring means very similar to that described in Arnold U.S. Pat. No. 3,461,484 while imposing a twist to the shirred stick as set forth in U.S. Pat. No. 3,397,069. The shirred stick was then compacted with a compression force of about 400 pounds (181 kg) onto tubular cores having a wall thickness of 0.010 inch (0.254 mm), 0.020 inch (0.508 mm), 0.030 inch (0.762 mm), 0.040 inch (1.016 mm), and 0.050 inch (1.270 mm). The cored articles were produced on a floating mandrel-type shirring machine, as described in detail in this specification, except that during final compaction on the core, the core 31 was allowed to slide freely through rear clamp 29 (FIG. 3), effectively compacting the casing simultaneously from both ends. This double ended compaction method, allowing high compacting loads without buckling the tubular core, is not a part of the present invention and is claimed in a copending patent application in the name of A. P. Urbutis et al as per Ser. No. 436,057, filed Oct. 22, 1982. All of the tubular cores had an inside diameter now U.S. Pat. No. 4,578,842 of 0.510 inch (1.30 cm) and the compression after shirring was done on a compression mandrel section of 0.500 inch (1.27 cm) diameter with the core elements slipped thereon. On all samples, moisture content as shirred was about 16.5 wt.% and mineral oil was used as an internal lubricant (about 14 to 20 mg/100 in$^2$) and external lubricant (up to about 70 mg/100 in$^2$). The lubricant amounts are not critical, but they represent the usual amounts for the particular shirring machine and casing type involved.

The upper portion of Table 1 shows the dimensions of the inside diameters of the cores immediately after they were doffed or removed from the mandrel, and at least one day and up to 20 days later. Reduction in core inner diameter was due to the high casing inward expansion force, resulting from the high pack ratio and high packing efficiency. It should be noted that the degree of core bore reduction is a function of tube diameter as well as the magnitude of inward forces and creep strength of the core (i.e. large casing requires greater core thickness than small casing to withstand the same inward force per unit area). It will be noted that the relatively low creep strength of the high density polyethylene permitted the 0.010 inch thick core to compress until the I.D.

of the core (0.480") was actually less than the bore of the uncored sample. The casing stick bore was, of course, greater (0.480+2(0.010)=0.500.)

Other core materials tested produced similar results with regard to core deformation. Cores made of ABS, an acrylonitrile-butadiene-styrene copolymer, tubing

TABLE 1

EFFECTS OF INWARD COMPRESSIVE FORCE

| Core Wall Thickness, Inches | 0.010" | | 0.020" | | 0.030" | | 0.040" | | 0.050" | |
|---|---|---|---|---|---|---|---|---|---|---|
| | Standup | Conical | Standup | Conical | Standup | Conical | Standup | Conical | Standup | Conical |
| Pack Ratio of Cored Samples | | | | | | | | | | |
| Compressed | 133.4 | 140.8 | 134.9 | 132.3 | 127.1 | 125.1 | 115.3 | 124.1 | 123.0 | 116.5 |
| Doffed | 115.5 | 125.0 | 122.5 | 121.5 | 114.7 | 120.2 | 113.5 | 115.2 | 119.7 | 111.4 |
| Later | 114.8 | 121.3 | 116.8 | 118.8 | 109.8 | 119.2 | 109.8 | 112.1 | 118.7 | 112.4 |
| Effective Core Inner Diameter, Inches | | | | | | | | | | |
| Doffed | .476 | .493 | .480 | .485 | .482 | .490 | .489 | .490 | .490 | .493 |
| Later | .465 | .480 | .477 | .485 | .480 | .487 | .482 | .490 | .485 | .492 |
| Packing Efficiency | | | | | | | | | | |
| Later | .55 | .68 | .58 | .70 | .57 | .73 | .59 | .73 | .67 | .76 |

| | Uncored Samples | |
|---|---|---|
| | Standup | Conical |
| Compressed Pack Ratio | 136.5 | 141.5 |
| Doffed Pack Ratio | 111.7 | 125.4 |
| Later Pack Ratio | 90.1 | 114.7 |
| Bore diameter, doffed | 0.532 | 0.519 |
| Bore diameter, later | 0.509 | 0.487 |
| Packing Efficiency Later | 0.44 | 0.63 |

The lower portion of Table 1 shows data on a sample of the same size casing, size 25, shirred and compacted on a 0.575 inch mandrel, but uncored, that is without a core. Although high pack ratio and packing efficiency were achieved with "conical" pleats (114.7 and 0.63 respectively) there was excessive reduction in bore size (as determined by drop fit) and this would be unacceptable for commercial practice. It would not be proper to directly compare this data with the Table I cored article data because each of the cored samples was compacted on a supporting core having an outer diameter which varied according to the wall thickness of the core.

Two pleat angles were used in these Table I shirring experiments. The designation "Standup" connotes a shirring pleat angle up to about 15°, and the designation "Conical" connotes a shirring pleat angle of about 45°. The "Standup" pleat samples were shirred with shirring means or rolls similar to those described in U.S. Pat. No. 2,984,574 (Matecki). The compressed pack ratio of the uncored conical pleat sample compares with the 210 ft. uncored sample in Table 2, where the stick is useless because of the loss of coherency.

The core material for the Table 1 experiments was high density polyethylene. For convenience, the cores were machined from thick-walled tubing, and the resulting rough outer surface somewhat reduced the pack ratio which could be attained. Inspection of Table 1 shows that for high density polyethylene cores, significant distortion of the bore of the casing article occurs even when the core thickness is as great as 0.050 inch. It is also shown in Table 1, that for a constant compacting force (in this example 400 lbs.), the resulting final pack ratio decreases proportionately as the core thickness increases (i.e. the core outside diameter increases). However, the packing efficiency also increases. In order to maximize pack ratio, stuffing horn fit, and packing efficiency, core design must take into account (a.) the creep of the core due to high inward casing forces as well as the required final bore size, (b.) reduction of pack ratio that would occur if excessive core wall thickness were used, and (c.) cost of core material.

worked satisfactorily at somewhat lower wall thickness than the high density polyethylene cores, but ABS cores are less economical.

EXAMPLE III

The advantages offered by the cored high density cellulose casing article in terms of packing efficiency and pack ratio are demonstrated by experimental work involving the shirring and compacting, to high pack ratio and high packing efficiency, of samples of size 25 (0.828 inch or 21 mm inflated diameter) cellulose casing (without fibrous reinforcement) having a casing wall thickness of 0.001 inch (0.0254 mm). The casing moisture level as shirred was about 16.5 wt.%, and mineral oil lubricant was used, as noted in Example II. Shirring means of the type in commercial use and similar to that disclosed in U.S. Pat. No. 3,461,484 to Arnold were used to shirr casing while imposing a twist to the shirred stick as set forth in U.S. Pat. No. 3,397,069, and each stick was subsequently compressed onto polypropylene tubular cores (polypropylene reinforced with 20% talc) for comparison with casing shirred by the same shirring methods, but compressed without cores. The cored high density casing articles were produced on a floating mandrel-type shirring machine, described in detail in this specification, except that during final compaction on the core, the core 31 was allowed to slide freely through rear clamp 29 (FIG. 3), effectively compacting the casing simultaneously from both ends. Additionally, to obtain a more uniform compression throughout the shirred casing stick, approximately 80 feet of casing was compacted at a time (incremental compression). The uncored samples and certain of the cored samples are designed to have a 0.490 inch drop-fit. Other cored samples were designed so that the tubular core might serve as a disposable stuffing horn. In these instances, the inside diameter of the core was effectively equivalent to the inside diameter of a 0.5 inch O.D. stuffing horn and the shirred article had no particular "drop fit" requirements with respect to the stuffing horn. For all samples, the shirred casing was compressed to a final stick length of about 20 inches. About ten samples were prepared for each of the cored configurations and for each of the uncored configurations which comprised casing lengths ranging from 160 to 225 feet.

The results of the experimental work are summarized in Table 2. For uncored articles having a casing length of 210 feet and over, poor coherency resulted in broken sticks and drop-fit measurements at one week were not possible. For uncored articles containing casing lengths of 187.5 to 202.5 feet, radial inward forces due to casing growth (after one week) reduced the shirred stick bores to a point where they did not meet the 0.490 inch drop-fit requirement. For comparison purposes, then, the best available shirring methods produced an uncored stick of shirred casing containing 160 feet of casing with an average pack ratio (10 samples) of 94.6 and an average packing efficiency of about 0.491. A cored high density shirred and compacted cellulose casing article of this invention designated to have a 0.490 inch drop-fit was produced by the same shirring method. This produced an article in which the core inner bore was about 59% of the casing inflated diameter. This article contained 200 feet of casing and exhibited an average pack ratio (10 samples) of 116.46 and an average packing efficiency of 0.653.

A second series of cored high density samples was produced wherein the core of the shirred article would serve as a disposable stuffing horn having a throughput capacity effectively equivalent to a standard 0.5 inch O.D. stuffing horn (0.436 in. I.D.). This produced an article in which the core inner bore was about 51% of the casing inflated diameter. This article contained 230 feet of casing, exhibiting an average pack ratio (10 samples) of 133.4 and an average packing efficiency of 0.617.

Further testing was performed to determine the quality of the shirred and compacted casing articles of this Example III (both cored and uncored), as evidenced by the number of pinholes present in the shirred casing. Five sticks of each sample type were tested for pinholes by filling the casing with water and internal pressurization. The results, shown in Table 2, indicate a general trend of increasing pinhole damage as the total casing length of the uncored article increased. In contrast, no pinholes were found in any of the cored samples tested.

In summary, Example III demonstrates that it was not possible to prepare a typical uncored shirred and compacted small cellulose casing of at least 0.5 packing efficiency without unacceptable bore (diameter) reduction. In contrast, this was readily achieved with the article of this invention, and in fact, the preferred packing efficiency of at least 0.6 was exceeded.

TABLE 2

| | SMALL SIZE CASTINGS UNCORED FOR DROP FIT OF 0.490 INCH | | | | | | | CORED | |
| --- | --- | --- | --- | --- | --- | --- | --- | --- | --- |
| | | | | | | | | FOR DROP FIT OF 0.490 INCH | FOR DISPOSABLE HORN EQUIVALENT TO 0.5 INCH HORN |
| Compression Section Dia., In. | 0.575 | | | | | | | 0.570 | 0.490 |
| Tubular Core O.D. × I.D., In. | | | | | | | | 0.570 × 0.510 | 0.490 × 0.440 |
| Casting Length, Ft. | 160 | 187.5 | 195 | 202.5 | 210 | 217.5 | 225 | 200 | 230 |
| Stick Length, In. | | | | | | | | | |
| Compressed | 18.99 | 19.0 | 19.0 | 18.0 | 18.0 | 17.25 | 17.25 | 19.88 | 19.56 |
| Doffed | 20.32 | 20.25 | 20.51 | 19.89 | 20.26 | 19.92 | 20.09 | 20.12 | 19.82 |
| 1 Week | 20.30 | 20.44 | 20.69 | 20.25 | 20.57 | 20.44 | 20.63 | 20.61 | 20.69 |
| Stick Pack Ratio | | | | | | | | | |
| Compressed | 101.10 | 118.4 | 123.2 | 135.0 | 140.0 | 151.3 | 156.5 | 120.72 | 141.10 |
| Doffed | 94.50 | 111.1 | 114.1 | 122.2 | 124.4 | 131.0 | 134.4 | 119.28 | 138.55 |
| 1 Week | 94.60 | 110.1 | 113.1 | 120.0 | 122.5 | 127.7 | 130.9 | 116.46 | 133.40 |
| Stick O.D., In. | | | | | | | | | |
| Compressed | NA | NA | NA | NA | NA | NA | NA | 0.968 | 0.985 |
| Doffed | 0.975 | 0.95 | 0.96 | 0.973 | 0.978 | 1.007 | 1.013 | 0.969 | 0.977 |
| 1 Week | 0.942 | 0.938 | 0.95 | 0.95 | 0.96 | 0.972 | 0.982 | 0.960 | 0.984 |
| Stick Drop Fit, Inches | | | | | | | | | |
| Doffed | 0.474 | 0.505 | 0.503 | 0.488 | 0.483 | 0.475 | 0.470 | 0.500 | 0.430 |
| 1 Week | 0.494 | 0.480* | 0.470* | 0.465* | Broken* Stick | Broken* Stick | Broken* Stick | 0.497 | 0.425 |
| Stick Packing Efficiency (After 1 Week) | 0.491 | — | — | — | — | — | — | 0.653 | 0.617 |
| Pinholes in A5 - Sample Group | 1 | 0 | 1 | 0 | 1 | 2 | 2 | 0 | 0 |

NA means data not available
*Stick is not functional since it does not meet 0.490 inch drop fit requirement This data also illustrates one preferred embodiment of the invention wherein based on a drop fit comparison, the core has an inner bore size at least as large as the inner bore size the same casing would have when shirred and highly compacted under the same shirring and compacting conditions without the core, and to the same pack ratio. More particularly, the core bore size of the 116.46 average pack ratio articles was 0.497 inch. In contrast, the bore sizes of the uncored shirred sticks with 113.1 and 120.0 pack ratios were 0.470 inch and 0.465 inch respectively, substantially smaller than the comparable cored article.

A second series of cored high density samples was produced wherein the core of the shirred article would

EXAMPLE IV

Another advantage of the cored high density shirred casing article of this invention is that it reduces the tendency towards casing damage, i.e. pin holing, when compared with the same casing if shirred and compacted under the same conditions without the core. This is because the core restrains longitudinal growth due to surface friction, and less compaction is required to maintain a particular pack ratio as compared with an uncored shirred stick. Since pin-holing increases with increasing compaction, a potential casing damage problem may be reduced or avoided by the article of the present invention.

Further, the core permits the capture and retention of the fully compressed pack ratio and permits even greater pack ratios without pinhole damage. The technique of capturing the fully compressed pack ratio is not a part of the present invention and is claimed in a copending patent application in the name of A. P. Urbutis et al as Ser. No. 434,559, filed Oct. 15, 1982, U.S. Pat. No. 4,493,130.

This compression relationship between cored and uncored shirred casing sticks was illustrated in a series of tests in which 160 foot lengths of size 25 nonfibrous cellulose casing were shirred and equally compacted with and without a core to a length of 15 inches and an initial pack ratio of 128. After doffing, the cored and uncored shirred sticks were allowed to grow over a seven day period without additional longitudinal restraint. At this point, the cored article had only longitudinally grown 0.4 inch (pack ratio after growth of about 125) whereas the uncored article had grown 1.4 inches (pack ratio after growth of about 117). If the objective had been a final pack ratio of 125, higher initial compaction force would have been required with the uncored shirred stick.

The advantage of less tendency toward casing damage may be utilized in another manner. If the practitioner identifies a maximum compaction force which may be used without causing casing damage when using this force, the cored article may be formed at a higher pack ratio and higher packing efficiency than an uncored article.

EXAMPLE V

A series of experiments was performed based on the teachings of the previously referenced British Patent 1,167,377, assigned to Viskase, Ltd., and comparing same with the cored high density shirred cellulosic stick of this invention.

Based upon the teachings of the above identified British Patent, a polyvinyl chloride tube with 1.613 inch I.D. and a 0.010 inch wall thickness was used as a core element, and Size 2½ fibrous reinforced cellulosic casing (about 2.4 inches inflated diameter) was shirred by shirring means similar to that disclosed in U.S. Pat. No. 3,461,484 (Arnold) and thereafter compressed to a length of 12.0 inches. The tube I.D. of 1.613 inch and the Size 2½ fibrous casing were selected for this test work because this was the smallest polyvinyl chloride tube which was available at the time of this test. The sample casing articles were prepared on a floating mandrel-type shirring machine in a manner previously described in detail in this specification, wherein the shirred casing is transferred after shirring onto a core coaxially arrayed with the shirring mandrel on a reduced diameter portion thereof, finally compacted in the Example I manner, and doffed. These samples had a moisture content as shirred of about 20% and mineral oil lubricant was used internally (about 200 mg/100 in$^2$) and externally (up to about 107 mg/100 in$^2$). The casing was provided in three different lengths: 75, 100 and 125 feet. Based on the compacted article, differing pack ratios were obtained. The resulting articles were then measured to determine the core inside diameter by the aforedescribed "drop fit" procedure. For the 75 foot sample, the drop fit size was 1.590 inches, thereby showing a core diameter size reduction of 0.023 inch. For the 100 foot sample, the drop fit size was 1.540 inches, thereby showing a core diameter size reduction of 0.073 inch. For the 125 foot sample, the drop fit size was less than 1.500 inches. However the core buckled at one end immediately after the article was compressed and doffed from the mandrel. This demonstrates the inability to obtain the cored high density shirred cellulosic stick of the invention by following the teachings of the British Patent.

The 75 foot example would still fit the 1.556 inch O.D. stuffing horn, but the packing efficiency would be only 0.43. The 100 foot samples caused bore shrinkage so great that they would not fit the horn. The 125 foot sample core collapsed completely.

EXAMPLE VI

Fibrous cellulosic casing articles similar in size to that used for the British patent-type sample described in Example V were prepared according to the subject invention and compared with uncored samples in order to explore the limits of compressibility as established by damage to the casing. Size 2½ (about 2.4 inch inflated diameter) and Size 4 (about 2.8 inch inflated diameter) casings were shirred by shirring means similar to that disclosed in U.S. Pat. No. 3,461,484 (Arnold). The moisture content of the Size 2½ and Size 4 samples as shirred was about 20%. Mineral oil was used as a lubricant as follows:

Size 2½—about 200 mg/100 in$^2$ (internal) and about 100 mg/100 in$^2$ (external)

Size 4—about 170 mg/100 in$^2$ (internal) and about 90 mg/100 in$^2$ (external)

The cored articles were compacted on polyvinyl chloride (PVC) cores in a manner identical to that used for Example V articles. The samples were compacted to a 12.0 inch length at a pack ratio of 150, which represented the highest pack ratio attainable with no damage to the Size 2½ casing. All samples were designed to fit on a 1.556 inch diameter stuffing horn. The cores used had an outside diameter of 1.713 inch and a wall thickness of 0.05 inch. Cored samples were restrained from longitudinal expansion by the use of a peg and uncored samples were restrained (only partially) by containment within a cardboard carton.

The results of the tests are shown in Table 3. The Size 2½ cored articles showed a final core bore size slightly too small for fitting the horn, but still larger than the bore of the uncored articles, even though the cored articles had a pack ratio of about 138 while the uncored articles had a pack ratio of only about 114. In practice, a slightly lower pack ratio would have provided an adequate horn fit with the core. The Size 4 cored articles were functional (in terms of pack ratio) after 15 days at a pack ratio of 138.46. Size 4 uncored articles exhibited a bore size reduction to a point of nonfunctionality after 15 days with a measured pack ratio of 128.48.

This Example VI also demonstrates, for cored fiber reinforced casing articles, one preferred embodiment of the invention wherein, based on a drop fit comparison, the core has an inner bore size at least as large as the inner bore size the same fibrous casing would have when shirred and highly compacted under the same shirring and compacting conditions without the core, and to the same compressed pack ratio. For example, with the Size 2½ casing the average uncored casing bore size of 1.540 inch was slightly smaller than the average cored inner bore size of 1.547 inch, even though the latter's final pack ratio was substantially higher (138 compared to 114). Similarly, with the Size 4 casing, the average uncored casing bore size of 1.547 inch was substantially smaller than the average cored casing bore size, even though the latter's final pack ratio was higher (138 compared to 128).

TABLE 3

| | FIBROUS CASING (for 1.556-dia. Stuffing Horn) | | | |
|---|---|---|---|---|
| | Size 2½ Casing (2.4-in. inflated dia.) | | Size 4 Casing (2.8-in. inflated dia.) | |
| | Cored | Uncored | Cored | Uncored |
| Tubular Core O.D. × I.D., inches | 1.713 × 1.613 | — | 1.713 × 1.613 | — |
| Casing Length, feet | 150 | 150 | 150 | 150 |
| Number of Samples | 9 | 17 | 9 | 17 |
| Stick Pack Ratio (average) | | | | |
| 2 days | 138.46 | 114.28 | 138.46 | 130.91 |
| 15 days | 138.46 | 113.92 | 138.46 | 128.48 |
| Stick Drop Fit (average) | | | | |
| 2 days | 1.564 | 1.552 | 1.583 | 1.550 |
| 15 days | 1.547 | 1.540 | 1.582 | 1.547 |

Comparison of the test results described above with those of Example V demonstrate that the British Patent 1,167,377 does not teach or even suggest the use of a core in a manner which will permit the simultaneous achievement of the three advantageous characteristics of the cored cellulosic casing article of this invention: high pack ratio, high packing efficiency, and limited deformation-reduction of the core bore size.

EXAMPLE VII

Still another series of tests was performed using a shirring means of the general type described in U.S. Pat. No. 3,461,484 (Arnold) while imposing a twist to the shirred stick as set forth in U.S. Pat. No. 3,397,069. In these tests the cored high density small diameter shirred cellulose casing articles were prepared using different core materials. The cored articles were produced on a floating mandrel-type shirring machine, as described in detail in this specification, except that during final compaction on the core, the core 31 was allowed to slide freely through rear clamp 29 (FIG. 3), thereby effectively compacting the casing simultaneously from both ends. Also as previously indicated, this double-ended compacting method is not part of the present invention and is claimed in a patent application filed in the name of A. P. Urbutis et al Ser. No. 436,057, filed Oct. 22, 1982, now U.S. Pat. No. 4,578,842. The core materials used in the tests were polypropylene (reinforced with a 20% talc filler), polystyrene, and high density polyethylene, each core having an outside diameter of 0.5 inch and a wall thickness of 0.025 inch. The casing used was size 25 cellulose (no fibrous support), and each casing article contained 200 feet of casing. On all samples, moisture content as-shirred was about 16.5% and mineral oil as a lubricant was used internally (about 14 to 20 mg/100 in$^2$) and externally (up to about 70 mg/100 in$^2$).

The test results, summarized in Table 4, demonstrate that the relatively lower coefficient of friction of the high density polyethylene core allowed compaction of the shirred casing to a significantly higher pack ratio than that obtained for the other core materials.

From the experimental work of Examples II and VII, it can be seen that the design of a core for the present invention will be based on core material properties such as strength, modulus of elasticity and creep resistance. These properties will determine the core wall thickness required to resist casing inward expansion forces which tend to distort and reduce the core bore size. The core material coefficient of friction will determine the magnitude of the longitudinal compacting forces which are needed to compress the casing to extremely high pack ratios.

It appears that many factors enter into the choice of core material including coefficient of friction, creep strength, modulus of elasticity, availability in extruded form, cost, formability, weldability, and availability in reinforced form. The final choice may be different for different applications. High density polyethylene and polyvinylchloride (PVC) are suitable for large casing embodiments of this invention.

TABLE 4

| | SMALL SIZE CASINGS Tubular Core ... 0.500-inch O.D. × 0.450-inch I.D. (for use as stuffing horn) Casing ... Size 25 Cellulose × 200-ft. long | | |
|---|---|---|---|
| | Core Material | | |
| | Polypropylene (Reinforced with Talc) | Polystyrene | High Density Polyethylene |
| Stick Pack Ratio | | | |
| Compressed | 149.3 | 148.0 | 174.0 |
| Doffed | 139.5 | 142.0 | 158.7 |
| 1 Week | 137.1 | 140.4 | 150.9 |
| Stick Drop Fit | | | |
| Doffed | 0.420 | 0.430 | 0.430 |
| 1 Week | 0.420 | 0.430 | 0.430 |

EXAMPLE VIII

Another series of tests was performed with cored high density casing articles similar to those described in Example III and summarized in Table 2. The only difference is that instead of final compaction from both ends, compaction was from one end in the same manner as practiced with the Table 2 uncored shirred casing sticks, and the compacted shirred sticks were transferred onto the core.

The results of these cored high density article tests, with non-fibrous Size 25 cellulose casing, are summarized in Table 5, and should be compared with the Table 2 uncored casing data. The cored high density article designated to have a 0.490 inch drop fit exhibited an average pack ratio (15 samples) of 129.2 and an average packing efficiency of 0.67. The cored high density article designated to serve as a 0.5 inch O.D. stuffing horn exhibited an average pack ratio (15 samples) of 140.1 and an average packing efficiency of 0.64.

In summary, while Example III demonstrates that it was not possible to prepare a typical uncored shirred and compacted small cellulose casing of at least 0.5 packing efficiency by single end compaction without unacceptably high bore reduction, this was readily achieved with the article of this invention, and in fact, the preferred packing efficiency of at least 0.6 was exceeded. Equipment was not available for double ended compaction of uncored sticks.

TABLE 5

SMALL SIZE CASING

|  | CORED | |
| --- | --- | --- |
|  | FOR DROP OF FIT 0.490 INCH | FOR DISPOSABLE HORN EQUIVALENT TO 0.5 INCH HORN |
| Compression Section Diameter, Inches | 0.575 | 0.512 |
| Tubular Core O.D × I.D., Inches | 0.560 × 0.510 | 0.500 × 0.450 |
| Casing Length, Ft. | 200 | 200 |
| Stick Length, In. | | |
| Compressed | 17.0 | 15.0 |
| Doffed | 18.63 | 17.1 |
| 1 Week | 18.58 | 17.13 |
| Stick Pack Ratio | | |
| Compressed | 141.2 | 160.0 |
| Doffed | 128.8 | 140.3 |
| 1 Week | 129.2 | 140.1 |
| Stick O.D., Inches | | |
| Compressed | NA | NA |
| Doffed | 0.983 | 0.939 |
| 1 Week | 0.979 | 0.987 |
| Stick Drop Fit, Inches | | |
| Doffed | 0.498 | 0.430 |
| 1 Week | 0.494 | 0.423 |
| Stick Packing Efficiency (After 1 Week) | 0.67 | 0.64 |

NA means data not available.

EXAMPLE IX

Still another series of tests was performed in which Size 25 cellulose casing (without fibrous reinforcement) was used to prepare uncored and cored high density shirred articles at various pack ratios, and examined from the standpoints of drop fit (FIG. 8) and coherency (FIG. 9). All articles were prepared from 160 feet of casing and the compacted shirred articles were of different lengths, depending on the pack ratio. The casing moisture level as shirred was about 16.5 wt.% and mineral oil was used as an internal lubricant (about 14 to 20 mg/100 in$^2$ of internal surface) and external lubricant (up to about 70 mg/100 in$^2$ of external surface) during shirring.

Shirring means of the type disclosed in U.S. Pat. No. 3,461,484 (Arnold) were used to shirr casing, while imposing a twist to the shirred stick as set forth in U.S. Pat. No. 3,397,069, and the casing was fully compacted in the conventional manner from one end on the mandrel compression section of a floating mandrel-type shirring machine as generally depicted in FIG. 3. After compaction, the shirred casing stick was doffed directly onto a tubular core. The latter was formed of polyvinyl chloride having 0.560 inch O.D.×0.506 inch I.D. For one group of tests, the compression section mandrel diameter was 0.575 inch. For the other group of tests, the compression section mandrel diameter was 0.595 inch.

The drop fit and coherency for both uncored and cored high density shirred articles were measured, along with pack ratio, seven days after doffing, and the data is summarized as functions of pack ratio in FIGS. 8 and 9.

FIG. 8 shows that the drop fit for both uncored compacted shirred sticks (0.575 and 0.595 inch mandrel compression sections) continuously declined with increasing pack ratio in the 95-120 pack ratio range. Since the minimum acceptable bore size for Size 25 casing (inflated diameter of 0.83 inch) is 0.490 inch (horizontal dashed line), the maximum usable pack ratio for the 0.575 inch mandrel is about 99. It will be noted that by using a larger mandrel (0.595 inch), the minimum bore size may be achieved at slightly higher pack ratio (about 103), but this increases the probability of casing damage due to pin-holing. Also, progressively larger mandrel sections, greater than about 0.575 inch for Size 25, progressively increase the probability of seizing on the mandrel, increase production interruption, and increase waste rate. Stated otherwise, it is well recognized by those skilled in the shirring art that the optimum setup for trouble-free shirrability of a particular casing size is one which uses the smallest mandrel which will achieve the desired bore size.

In contrast to the aforedescribed uncored shirred stick pack ratio limitation due to bore size requirement (about 99), FIG. 8 demonstrates that for Size 25 cored casing, the drop fit was constant with increasing pack ratio up to a pack ratio of about 124, using the same 0.575 inch mandrel size. With further increase in pack ratio, the core inner bore size begins to inwardly deflect due to excessive inward force from the shirred stick. Accordingly, 124 represents a practical upper limit in pack ratio for this particular embodiment wherein the casing inflated diameter is about 0.83 inch, the pack ratio is greater than 100, and the drop fit is at least 0.490 inch.

It has been unexpectedly discovered that when the pack ratio of uncored shirred sticks of cellulose casing (without fibrous reinforcement) is in the region of pack ratios achievable with the cored casing article of this invention, coherency of the uncored sticks progressively decreases with increasing pack ratio. This is contrary to expectations since at lower pack ratios, as used in commercial practice, the coherency of the same uncored stick is known by the art to progressively increase with increasing pack ratio.

This unexpected discovery that coherency declines with increasing pack ratio for uncored shirred cellulose casing sticks is illustrated in FIG. 9 for Size 25 casing. It will be noted that for a 0.575 inch mandrel, coherency declines at a nearly constant and high rate from about 5 (pack ratio of 100) to at least as low as 1.5 (pack ratio of 125). The latter pack ratio is only slightly above the minimum commercially acceptable coherency of 1.2 and it is substantially below the preferred coherency of 2.5. In contrast, with the cored high density shirred casing article of this invention, there is no coherency limitation because the compacted shirred casing is supported by and in functional contact with the core outer wall.

Although not fully understood, it is speculated that the aforedescribed coherency—pack ratio relationship for uncored shirred cellulose casing sticks is related to the degree of casing pleat compression. A possible explanation is that in the lower pack ratio range the compression of the pleats generates a tighter nesting of the individual cones, thereby increasing the contact area between adjacent cones and thus increasing the coherency. However, as the compression is further increased to create even higher pack ratios, the high compression may disrupt nesting of the cones, thereby reducing the coherency. This possible explanation is consistent with the experimental observation that as pack ratio of uncored shirred cellulose casing sticks is progressively increased, coherency initially increases to a maximum value and then progressively decreases. The possible explanation is also consistent with the experimental observation that larger casing sizes have higher coherencies at higher pack ratios than smaller casing sizes (see FIG. 11 discussed hereinafter). This may be due to the larger surface areas of adjacent cones in contact with each other in relatively large size casings.

The data for Size 25, 160 foot casing, which is summarized in FIGS. 8 and 9 also supports the broad requirements of this invention that the cored article have a packing efficiency not less than 0.50, and that its pack ratio and packing efficiency be respectively greater than the pack ratio and packing efficiency of the same casing length, shirred and highly compacted under the same shirring and compacting conditions, without the core. More particularly, the seven day characteristics of the samples, (a) the highest pack ratio cored article which satisfied the minimum 0.490 inch drop fit requirement, (b) the uncored article which was shirred and compacted under the same conditions as sample (a), and (c) the highest pack ratio uncored article which also satisfied the same minimum drop fit requirement, were as follows:

| Sample | Drop Fit | Pack Ratio | Packing Efficiency |
|---|---|---|---|
| (a) cored article | 0.50 inch | 124 | 0.66 |
| (b) uncored article | 0.46 inch | 116 | 0.54 |
| (c) uncored article | 0.50 inch | 98 | 0.44 |

This data shows that the drop fit, pack ratio and packing efficiency of sample (a) were all higher than sample (b). Moreover, sample (b) was not acceptable product because the stick grew inwardly into the stick bore to the extent that the sample (b) stick did not satisfy the minimum drop fit requirement. Recognizing this deficiency in bore size for sample (b), uncored article (c) was the best uncored shirred stick which would perform the same function as cored article (a). On this basis, sample (a) represented a 26% improvement in pack ratio and a 50% improvement in packing efficiency.

EXAMPLE X

A further series of tests, similar to the Example IX tests with Size 25 casing, was performed with three differing (smaller and larger) sizes of cellulose casing without fibrous reinforcement. They were Size 17 (0.61 inch inflated diameter and wall thickness of 0.001 inch), Size 21 (0.73 inch inflated diameter and wall thickness of 0.001 inch), and Size 27 (0.89 inch inflated diameter and wall thickness of 0.001 inch). One difference from the Example IX tests is that instead of using the same length of casing and preparing different stick lengths depending on the pack ratio, in these tests the casing length was varied and the sticks were compressed to provide about the same final stick length for each casing size (7 days after doffing). For Size 17 casing the final stick length was about 16 inches, whereas with Size 21 and 27 casing the final stick length was about 20½ inches.

Another difference between these tests and those of Example IX is that there were no cored articles of this invention prepared from Size 17, 21 or 27 casing. However, in another similar test, a cored high density shirred cellulose casing article was prepared from Size 21 casing, and it had the following characteristics: pack ratio of 119.8; packing efficiency of 0.66; and core inner bore size of 0.422 inch. Thus, this cored shirred casing article was suitable for use on the intended 0.406 inch O.D. stuffing horn. As is demonstrated by the uncored shirred stick curves for Size 21 casing in FIGS. 10 and 11 (discussed hereinafter), these outstanding characteristics cannot be even approached by the prior art uncored shirred casing.

With the exception of the aforedescribed differences, the Size 17, 21 and 27 uncored high density shirred sticks were prepared in the same manner as the Size 25 uncored high density shirred sticks. After doffing and seven days storage without longitudinal restraint, the resulting sticks were then subjected to drop fit and coherency measurements. The data is summarized in the FIG. 10 (drop fit) and FIG. 11 (coherency) curves as a function of pack ratio.

Inspection of FIG. 10 reveals that like Size 25 casing (FIG. 8), the drop fits of all three sizes progressively decrease with increasing pack ratio at substantially constant rates. For Size 17 casing, the minimum acceptable drop fit is 0.360 inch (see dashed horizontal line), so that from the drop fit standpoint, the maximum pack ratio attainable with the prior art uncored shirred stick is about 80. Similarly, with Size 21 casing, the minimum acceptable drop fit is 0.410 inch so the maximum pack ratio attainable with the prior art uncored shirred stick is about 98. Finally, for Size 27 casing, the minimum acceptable drop fit is 0.530 so the maximum pack ratio attainable with the prior art uncored shirred stick is about 130.

Figure 11:
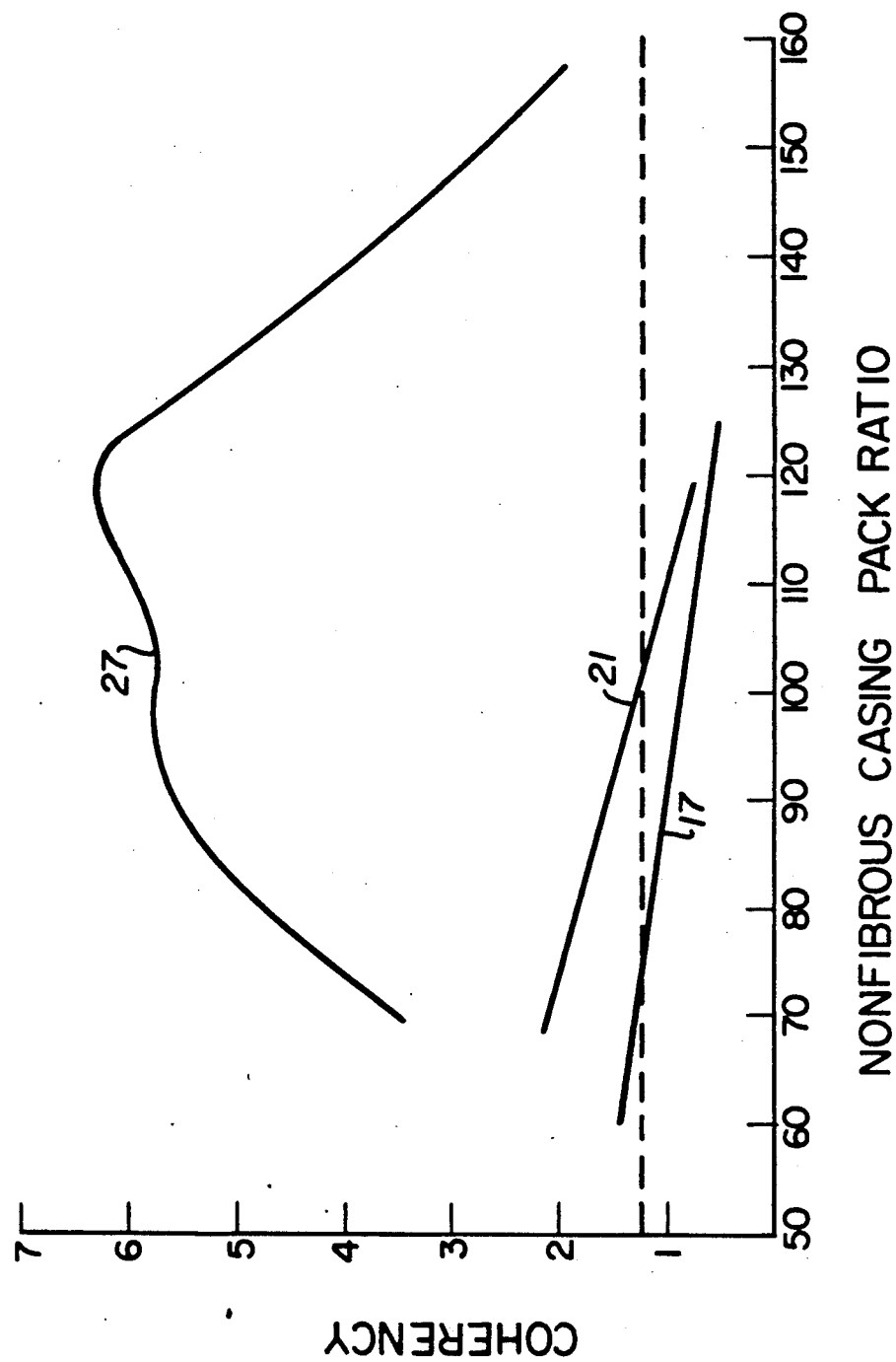
FIG. 11 is a graph showing coherency as a function of pack ratio for the FIG. 10 uncored shirred sticks.

Referring now to the coherency versus pack ratio curves of FIG. 11, all show the previously discussed unexpected relationship of declining coherency with increasing pack ratio in the upper range of pack ratios for each casing size. For Size 17, the coherency over the entire tested range of 60–125 pack ratios is low, recognizing the minimum acceptable value of 1.2 (horizontal dashed line). For Size 17 uncored shirred casing, the maximum attainable pack ratio from the coherency standpoint is also about 80. For Size 21, the coherency over the entire tested range of 70–120 pack ratios is also low, and based on the minimum acceptable coherency value of 1.2, the maximum attainable pack ratio from the coherency standpoint is about 102.

For Size 27 uncored shirred casing, the aforedescribed full range of coherency versus increasing pack ratio relationships is illustrated. That is, for pack ratios up to about 120, the coherency increases with increasing pack ratio. However beyond pack ratios of about 122, coherency decreases at an approximately constant and fairly sharp rate.

Based on FIGS. 10 and 11, it will be apparent that drop fit and coherency requirements place substantial restrictions on the use of high pack ratios with prior art uncored shirred sticks formed from Sizes 17, 21 and 27 cellulose casings. In each instance, the article of this invention may provide substantially higher pack ratios with acceptable core bore size and higher coherency, and with less tendency towards casing damage in the form of pin-holes. More particularly, a cored shirred Size 17 casing article of this invention with a casing inflated diameter of about 0.61 inch and a drop fit of at least 0.360 inch preferably has a pack ratio greater than 80. Also, a cored shirred Size 21 casing article of the invention with a casing inflated diameter of about 0.73 inch and a drop fit of at least 0.410 inch preferably has a pack ratio greater than 98. Finally, a cored shirred Size 27 casing article of the invention with a casing inflated diameter of about 0.89 inch and a drop fit of at least 0.530 inch preferably has a pack ratio greater than 130.

EXAMPLE XI

The pack ratio and packing efficiency advantages of the intermediate size fibrous reinforced-type casing article embodiments of the invention were demonstrated in still another series of tests involving both cored and uncored samples. Size 43, 47 and 60 casings having flat widths in the size range of about 2.30 to 3.30 inches were used to prepare shirred and compacted, cored and uncored stick articles to fit a stuffing horn of 1.073±0.005 inch outside diameter. Size 70, 80 and 100 casings having flat widths in the size range of about 3.75 to 5.50 inches were used to prepare shirred and compacted cored and uncored stick articles to fit a stuffing horn of 1.556±0.005 inch outside diameter. The casing wall thickness for all samples was about 0.0031 inch. The casing moisture level as shirred was about 20%, and mineral oil was used as an internal lubricant (about 44 mg/100 in$^2$ of internal surface) and external lubricant (up to about 30 mg/100 in$^2$ of external surface). The inflated diameters of these fibrous reinforced casings are as follows:

| Size | Inflated Diameter (Inches) |
| --- | --- |
| 43 | 1.480 |
| 47 | 1.588 |
| 60 | 2.063 |
| 70 | 2.387 |
| 80 | 2.772 |
| 100 | 3.485 |

In these tests, different casing lengths were compressed to obtain substantially the same stick length at all pack ratios for a particular size casing. These compressed stick lengths were as follows: Size 43, 10.5 inches; Size 47, 10.0 inches; Size 60, 9.0 inches; Size 70, 12.0 inches; Size 80, 12.0 inches; and Size 100, 12.0 inches.

All sample casing articles were prepared on a floating mandrel-type shirring machine as previously described. The shirring means were of the type in commercial use and similar to that disclosed in Arnold U.S. Pat. No. 3,461,484. Multiple samples were prepared at each condition. The uncored samples were shirred and compressed from one end on the mandrel to that maximum pack ratio which allowed no casing damage, and to lower pack ratios. The maximum "no-damage" pack ratio was determined by testing for holes by filling with water and internal pressurization. When damage was detected, additional samples were prepared at slightly lower pack ratios and these samples were water tested for pin holes as noted. The sequence was repeated until a pack ratio was reached with no casing damage, and this represented the maximum pack ratio.

After compaction on the mandrel, the Size 43, 47 and 60 uncored samples were transferred from the shirring machine to a small diameter (1.1 inch) plastic tube for handling purposes, and after about one hour, were removed from the tubes and inserted in netting. The latter was clipped at both ends, and the clipped-end netting overwrap represents commercial practice to facilitate handling. This arrangement provides a slight restraint on longitudinal growth. The Size 70, 80 and 100 uncored samples were transferred from the shirring machine directly into a polyvinyl chloride film overwrap which provided very limited end restraint. Again this represents commercial practice for handling purposes.

The cores were made of rigid polyvinyl chloride. For casing Sizes 43, 47 and 60, the core outside diameter was 1.230 inch and the wall thickness was 0.050 inch. For casing Sizes 70, 80 and 100, the core outside diameter was 1.713 inch and the wall thickness was also 0.050 inch.

After shirring, the to-be-cored samples were longitudinally moved from the mandrel onto cores which were coaxially arrayed with the shirring mandrel around a reduced diameter portion of the mandrel, in the manner previously described and illustrated in FIG. 3. The shirred stick was then compacted to the desired pack ratio on the core by compression from one end, and doffed. The cored samples were compressed to pack ratios equivalent to those for the uncored samples.

After doffing, the cored shirred casing article was provided with means equivalent to core-mounted holding discs 35 and flange 39 (as shown in FIG. 6) at opposite ends of the shirred stick to maintain the doffed length during the seven day storage period. This degree of longitudinal end restraint would not be practiced with uncored sticks because they would either buckle or grow inwardly to the extent of not fitting the desired stuffing horn. Accordingly, the netting and plastic film overwrap used with the uncored sticks, did not substantially restrain longitudinal growth.

The stick lengths were measured before doffing of both uncored and cored samples and again measured after the seven day storage period. The results of these measurements are shown in FIG. 12 for the size 43, 47 and 60 fibrous reinforced casings and in FIG. 13 for the size 70, 80 and 100 fibrous casings, with pack ratios plotted as a function of casing flat width.

Figure 12:
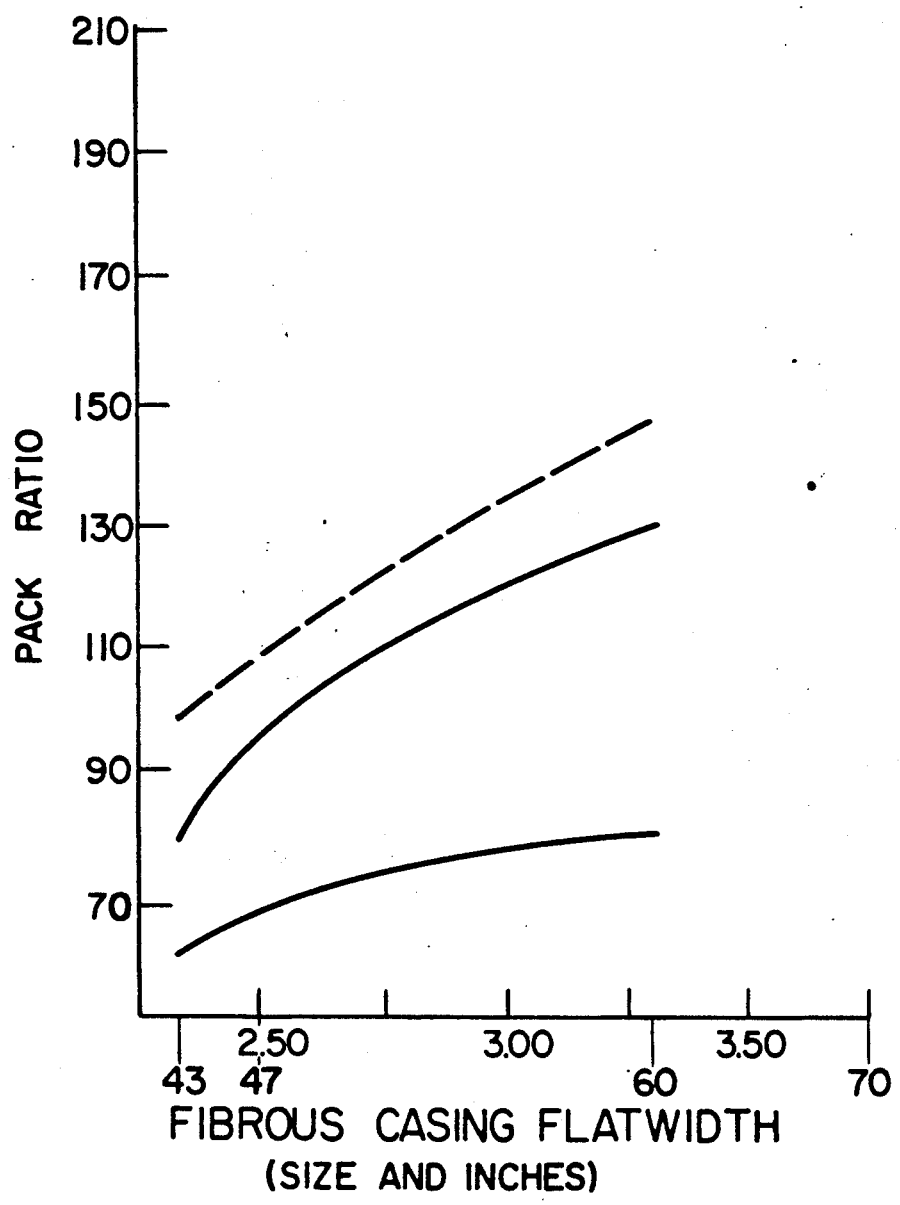
FIG. 12 is a graph showing the maximum pack ratio attainable for uncored and cored shirred sticks formed from intermediate size fibrous casings in the size 43 to 60 range, to fit a 1.073 inch stuffing horn.
Figure 13:
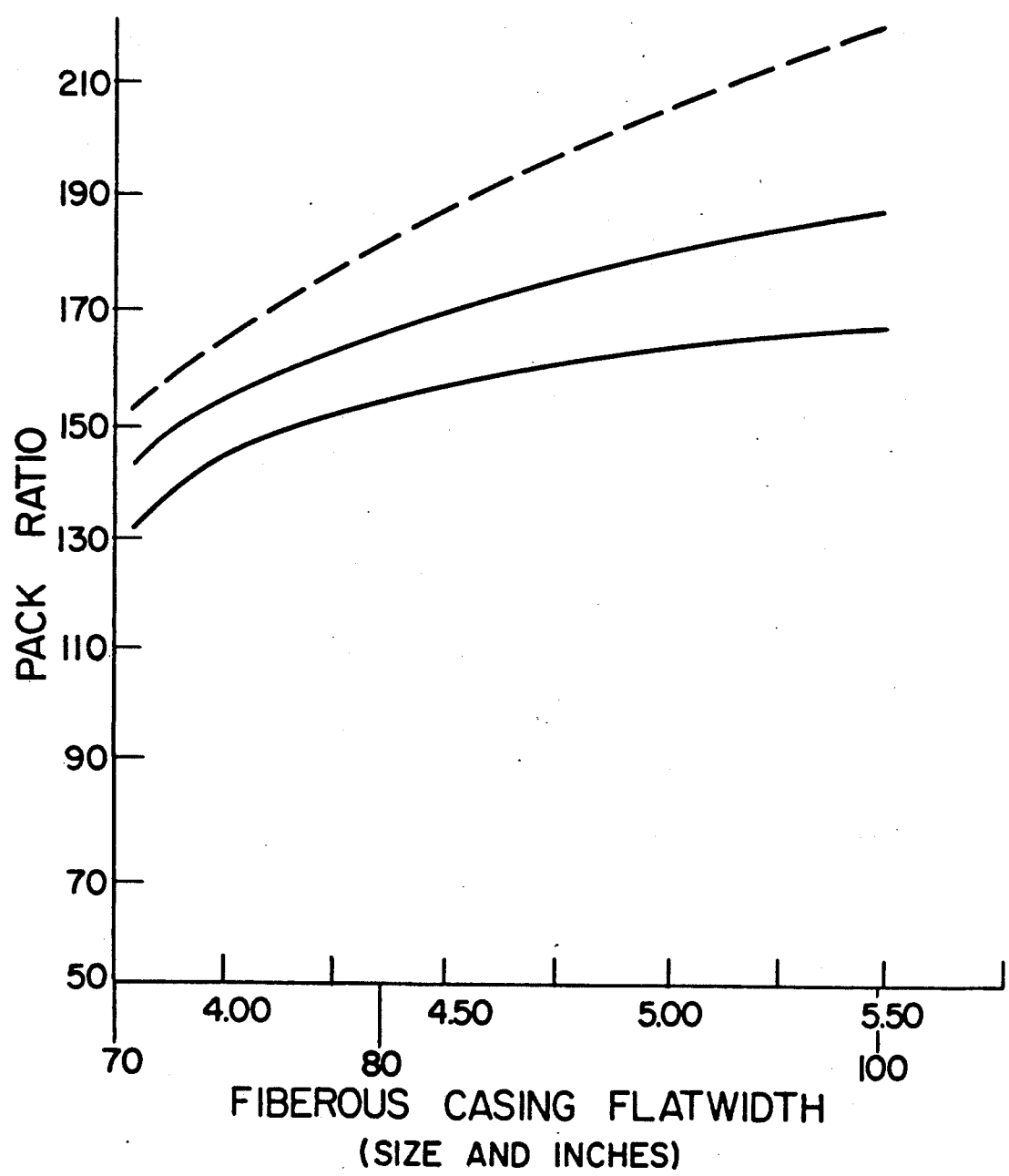
FIG. 13 is a graph showing the same relationship as FIG. 12 for intermediate size fibrous casings in the size 70 to 100 range, to fit a 1.556 inch stuffing horn.

In both FIGS. 12 and 13, the lowest curve represents the uncored shirred and compacted stick after seven days storage. The middle curve represents the cored shirred and compacted article also after seven days storage, and the uppermost curve (dashed line) represents the cored shirred and compacted article immediately after compaction. The latter is included because it represents an achieveable state with the present invention, which is unattainable with the prior art uncored shirred stick. That is, by "capturing" the cored article opposite ends after compaction but prior to doffing, as for example with longitudinal end restraint means, the initial (and highest) pack ratio may be retained with no loss of other essential stick characteristics. For example, there is minimal loss of bore size because the compacted stick is restrained from radial inward growth by the core. However, if one used longitudinal end restraint means with an uncored stick immediately after doffing, the initial highest pack ratio would be retained but there would be additional inward bore growth, beyond that which occurs without longitudinal end restraint. Since the practitioner uses the smallest possible shirring mandrel for optimum results (for reasons previously explained), in all likelihood, the additional radial inward growth would result in a bore size which is too small to fit the intended stuffing horn.

More specifically, FIG. 12 shows that based on comparison of the seven day pack ratio values for size 43-60 fibrous reinforced casing uncored and cored article (two lower curves), the least improvement is with Size 43 casing, and here the difference is about 78 minus 60, or a pack ratio improvement of about 30% when using the cored article. The largest improvement is with Size 60 casing, and here the difference is 129 minus 79, or about a 63% improvement in pack ratio using the cored article. The potential maximum improvement based on comparison of the uncored seven day pack ratio (lowest curve) with the initial highest pack ratio (highest, dashed line curve) is substantially greater. For example, with Size 43 casing the difference is 97 minus 60, or about a 62% higher pack ratio, and with Size 60 casing the difference is 146 minus 79, or about 85%.

A comparison of packing efficiencies and pack ratios for the uncored and cored shirred fibrous casing articles of Sizes 43, 47 and 60 as described in this Example XI is as follows:

| Casing Size | Packing Efficiency (and Pack Ratio) | | |
|---|---|---|---|
| | Uncored (7 days) | Cored (7 days) | Cored (Initial) |
| 43 | 0.54 (60) | 0.74 (78) | 0.78 (82) |
| 47 | 0.53 (66) | 0.76 (95) | 0.81 (102) |
| 60 | 0.45 (79) | 0.75 (130) | 0.85 (147) |

FIG. 13 shows that based upon a comparison of the seven day pack ratio values for the Size 70-100 fibrous reinforced casing uncored and cored article, the pack ratio improvement is less than with the Size 43-60 casing, but still substantial. The least improvement is with Size 80 casing, and here the difference is 166 minus 154, or about 8%. The potential maximum improvement based on comparison of the uncored seven day pack ratio with the initial highest pack ratio for Size 80 casing is 180 minus 154, or about 17%.

A comparison of packing efficiencies and pack ratios for the uncored and cored shirred fibrous casing articles of Sizes 70, 80 and 100 as described in this Example XI is as follows:

| Casing Size | Packing Efficiency (and Pack Ratio) | | |
|---|---|---|---|
| | Uncored (7 days) | Cored (7 days) | Cored (Initial) |
| 70 | 0.66 (129) | 0.77 (141) | 0.82 (150) |
| 80 | 0.63 (154) | 0.71 (166) | 0.77 (180) |
| 100 | 0.50 (167) | 0.59 (187) | 0.70 (220) |

Although coherency is also important with fibrous reinforced cellulosic casings, it does not present the same serious problems as with small diameter unreinforced cellulose casings. This is in part because the former are inherently stronger due to the fiber reinforcement, but also because of differences in the stuffing apparatus used for each.

The small diameter cellulose casings are typically stuffed using high speed completely automated machinery wherein the next stick to be used is automatically advanced into stuffing position when the previous stick is exhausted. Poor coherency can cause broken sticks, which in turn may cause casing breakage or tearing upon insertion or rotation of the automated stuffing horn. When this happens, a considerable quantity of food emulsion is released to the surroundings before the apparatus can be stopped, and substantial "down" time is needed for cleanup and removal of the broken casing.

In contrast, with larger diameter fibrous casings the machine speed is usually slower and the next stick is manually positioned for use by the operator. If there is casing breakage (less likely because of fibrous reinforcement), the apparatus can be stopped before a substantial quantity of foodstuff has been released and the "down" time is shorter.

EXAMPLE XII

Before discovery of this invention, applicants' assignee, Union Carbide Corporation, developed and marketed a machine, the SHIRMATIC ® Model 405 Sizer, for stuffing deboned whole muscle hams into large diameter fibrous reinforced cellulosic casings of the type previously described. It was designed to use shirred casing with a sizing disk implanted in one deshirred end of the uncored shirred stick. At the outset of the machine design, the need for maximum bore size of the stuffing horn was recognized, as well as the limitation on horn size imposed by the maximum obtainable bore of the shirred casing stick. To obtain the maximum horn size, the horn wall thickness was reduced to the minimum acceptable from the strength standpoint, the casing length was necessarily and undesirably reduced from 200 feet to 150 feet, and the shirring conditions were optimized for the largest attainable bore size. Also, the tension sleeve wall thickness and the clearance over the stuffing horn were necessarily and undesirably reduced to the minimum acceptable dimensions.

The result of these efforts was the use of the highest state of shirring art then available, and the use of a 3⅝ inch inside diameter stuffing horn. The original as-marketed SHIRMATIC Model 405 Sizer is described in detail in Belgium Patent No. 888,526. A substantial number of these machines were installed in meat packing plants, but for most applications they were found to be unsatisfactory. It was observed that the extreme elongation of the ham pieces while passing through the horn and subsequent "jumbling" when stuffed into the casing caused the surface fat to turn into the interior of the stuffed encased hams and caused poor muscle fiber grain arrangement. The system was not deemed by the meat packers to be equivalent to hand stuffing, and attempts to market the SHIRMATIC Model 405 Sizers were temporarily suspended.

Tests were then run in the food laboratory of the applicants' assignee using larger stuffing horns and unshirred casing. These tests demonstrated conclusively that a larger horn size would solve the problems being encountered with the SHIRMATIC Model 405 Sizer, and that the hams produced with a larger stuffing horn were as good as hams produced by hand stuffing.

By this time, applicants had begun developing the cored high density shirred casing stick of the present invention. Development work showed that utilizing the inventive cored high density shirred casing stick as a stuffing horn resulted in an increase of the horn I.D. to 3¾ inch. Part of this gain in horn size was due to the elimination of the tension sleeve of the SHIRMATIC Model 405 Sizer. The tension sleeve was replaced by a tiltable holdback device as disclosed in copending application, Ser. No. 261,313, filed on May 1, 1981, now U.S. Pat. No. 4,467,499 and assigned to the same assignee as the instant application.

As a result of these modifications to the SHIRMATIC Model 405 Sizer, the horn size increased for a Size 10 fibrous casing from a 3⅝ inch I.D. to a 3¾ inch I.D. This is a diameter gain of ⅛ inch or 11.1%. This diameter increase in turn provides an effective increase in cross-sectional area for the inside of the stuffing horn of 23.5%. Of this 23.5% increase in horn cross-section, 7.5% is attributable to the elimination of the prior art tension sleeve and 16.0% is attributable to the use of the cored high density shirred product of the present invention.

Additionally, by modifying the stuffing horn and using the cored casing stick in this manner, it was possible to increase the pack ratio of Size 10 fibrous casing from about 78 to about 130, which is a 67% increase. Also, the packing efficiency was increased from 0.39 to 0.76, and the casing length was increased from 150 feet to 250 feet. This modification of the stuffing system is now being marketed as the SHIRMATIC Model 405H System. Example I of this Specification is a specific illustration of a cored fibrous casing article used in the Model 405H System.

This example also illustrates the preferred embodiment of the cored article wherein based on a bore size comparison, the core has a bore size at least as large as the inner bore size the casing would have when shirred and highly compacted under the same shirring and compacting conditions without the core, and to the same pack ratio. In particular, based on Size 10 fibrous casing, the modified machine (SHIRMATIC Model 405H) with the cored article employs a core with a 3¾ inch bore size, whereas the inner bore size of the uncored shirred stick was about 3⅝ inch when shirred and compacted to a pack ratio of 78. The core used with this particular size casing is formed of high density polyethylene and has a wall thickness of 0.062 inch.

After the modification program was completed, the SHIRMATIC Model 405H System was taken back to the meat packers who were dissatisfied with the original SHIRMATIC Model 405 Sizer, and they have now accepted the Model 405H System as an important improvement in ham stuffing. Ten months after introduction of the SHIRMATIC Model 405H System, twenty machines were in commercial use and more of such machines are being installed at meat packing facilities on a regular basis. The SHIRMATIC Model 405 Sizer has now been withdrawn from the market for the previously stated reasons, and the outstanding success of the SHIRMATIC Model 405H System is clearly attributable, in great part, to the present invention.

The invention then, as hereinabove described, provides a significant advance in the art. More shirred casing in a given stick length permits longer continuous production runs. Higher packing efficiency provides a more favorable combination of high pack ratio and large bore size which can maintain or improve stuffing characteristics while achieving the longer continuous production runs. The invention completely eliminates coherency and stick growth problems that heretofore have plagued producers and users of small casing. The moisturized (no-soak) feature of the article of this invention is especially advantageous since the characteristically high pack ratios cannot be practiced with casing in which the soaking is done by the casing user prior to stuffing. This is because the tight pleats would inhibit entrance of the water into the casing wall and adequate soaking would not be accomplished within a commercially acceptable period of time.

It should be understood that for purposes of comparing inner bore circumferences for cored and uncored shirred and compacted casing articles, the comparison should be made at least about one week after manufacture.

Data from the Examples show that tubular cores as used in the casing articles according to the present invention have a ratio of core bore to core wall thickness of from about 10:1 to about 60:1 and the one week comparisons show that the core bore diameter of the casing article (based on a drop fit measurement) is from about 1.9%, to about 6.7% smaller than the original diameter of the tubular core.

Embodiments of the invention other than those described hereinabove, but within the spirit and scope of this invention, may, in the light of this disclosure, occur to persons familiar with the art. It is intended, therefore, that the foregoing description of the invention be construed as illustrative only and not in any limiting sense, the invention being properly defined and limited by the appended claims.

What is claimed is:

1. A shirred tubular casing article comprising:
   a) a length of a pre-moisturized flexible tubular cellulosic casing for being filled with a foodstuff and an elongate straight cylindrical tube the wall of which is composed of polymeric material and is formed substantially throughout its length to a substantially imperforate uniform wall thickness and an inside diameter slightly greater than a certain minimum bore diameter desired for the filling of said casing with a said foodstuff;
   b) said formed inside diameter of said tube wall being in a ratio to said wall thickness in the range of about 10:1 to 60:1;
   c) said casing length having been shirred and then compacted longitudinally and fixed coaxially on said tube wall under longitudinal compressive forces that compacted the pleats of the shirred casing length so highly that said pleats contain the casing length at an enhanced pack ratio and exert on said wall strong inward forces which appreciably contract said tube wall inwardly in the course of time to an inside diameter from about 1.9% to not more than 6.7% smaller than the formed inside diameter of said tube wall;
   d) said tube wall being sufficiently thick and rigid that it constitutes a substantially rigid hollow constraining means operative to sustain said inward forces so that said pleats grip tight onto said tube wall and form with said tube a said shirred casing article which in the course of time, retains the pleats of shirred casing highly compacted and which retains, throughout its length, an inside diameter no smaller than said minimum bore diameter; and
   e) the casing contained in said shirred casing article being desirable and drawable forward away from said tube by the pressure of a said foodstuff pressed along the inside of said tube and into a deshirred forward portion of said casing length extended from said pleats over the fore end of said tube.

2. A shirred tubular casing article according to claim 1, said tube wall further constituting a substantially imperforate, straight cylindrical conduit means for conducting the foodstuff under pressure directly in and through said tube into a said forward portion of said casing length.

3. A shirred tubular casing article as in claim 1 wherein said casing has an inflated diameter of from about 1.5 inches to about 3.9 inches and said tube wall thickness is in the range of from about 0.040 inch to about 0.060 inch.

4. A shirred tubular casing article as in claim 1 wherein said casing has an inflated diameter of from about 4.0 inches to about 6.0 inches and said tube wall thickness is in the range of from about 0.050 inch to about 0.075 inch.

5. A shirred tubular casing article as in claim 1 wherein said casing has an inflated diameter of from about 1.5 inches to 3.5 inches, said tube wall thickness is about 0.05 inch and the ratio of said formed inside diameter of said tube wall to said tube wall thickness is in the range of from about 22:1 to about 33:1.

6. A shirred casing article according to claim 3, 4 or 5 wherein said casing is fiberous casing.

7. A shirred tubular casing article according to any one of claims 2 or 1, said casing being of about 0.001 inch in wall thickness and having an inflated diameter in the range from about 0.61 inch to about 0.89 inch; said tube wall thickness being in the range from 0.02 inch to about 0.05 inch and the ratio of said formed inside diameter of said tube wall to said tube wall thickness being less than about 26.1.

8. A shirred tubular casing article according to claim 7, the inside diameter of said tube wall, as retained in the course of time under said inward forces, being in the range of from about 50% to about 59% of the inflated diameter of said casing.

9. A shirred tubular casing article according to any one of claims 2 or 1, said casing being of about 0.001 inch in wall thickness and having an inflated diameter of about 0.83 inch, said casing length comprising at least about 160 feet of said casing and said pleats thereof containing the casing at a pack ratio of at least about 116; said tube wall thickness being in the range from about 0.025 inch to about 0.050 inch, and said formed inside diameter of said tube wall being of at least 0.50 inch, and in a ratio to said tube wall thickness in the range from about 10:1 to about 26:1.

10. A shirred tubular casing article according to claim 2 or 1, said casing being of about 0.001 inch in wall thickness and having an inflated diameter of about 0.83 inch; said casing length comprising at least about 160 feet of said casing and said pleats thereof containing the casing at a pack ratio greater than 124; said tube wall thickness being in the range from about 0.025 inch to about 0.05 inch, and said formed inside diameter of said tube wall being of at least about 0.440 inch and in a ratio to said tube wall thickness in the range of from about 10:1 to about 26:1, and the inside diameter of said tube wall, as retained in the course of time under said inward forces, being not more than about 6.7% smaller than said formed inside diameter.

* * * * *

UNITED STATES PATENT AND TRADEMARK OFFICE
CERTIFICATE OF CORRECTION

PATENT NO. : 5,038,832

DATED : August 13, 1991

INVENTOR(S) : George H. Mahoney, John H. Beckman, Arthur L. Sheridan

It is certified that error appears in the above-identified patent and that said Letters Patent is hereby corrected as shown below:

In col. 16, line 43, after "1982" insert --now U.S. Patent No. 4,578,842--

In col. 16, lines 44 & 45, after "diameter" delete "now U.S. Patent No. 4,578,842

In cols. 19 & 20, TABLE 2, line 44, delete "0.975" and insert --0.945--

In cols. 19 & 20, TABLE 2, line 48, after "0.497" insert -----

In col. 34, line 4, delete "int he" and insert --in the--

In col. 34, line 55, delete "desirable" and insert --deshirrable--

In col. 35, line 25, delete "26.1" and insert --26:1--

Signed and Sealed this

Eighth Day of June, 1993

Attest:

MICHAEL K. KIRK

Attesting Officer

Acting Commissioner of Patents and Trademarks